US012770225B2

(12) United States Patent
Lee et al.

(10) Patent No.: US 12,770,225 B2
(45) Date of Patent: Oct. 20, 2026

(54) IMAGE ACQUISITION DEVICE AND ELECTRONIC DEVICE INCLUDING THE SAME

(71) Applicants: SAMSUNG ELECTRONICS CO., LTD., Suwon-si (KR); Morpho, Inc., Tokyo (JP)

(72) Inventors: Sangyoon Lee, Suwon-si (KR); Satoshi Nagayama, Tokyo (JP); Woo-Shik Kim, Suwon-si (KR); Heejin Choi, Suwon-si (KR); Jaesung Lee, Seoul (KR)

(73) Assignees: SAMSUNG ELECTRONICS CO., LTD., Suwon-si (KR); Morpho, Inc., Tokyo (JP)

( * ) Notice: Subject to any disclaimer, the term of this patent is extended or adjusted under 35 U.S.C. 154(b) by 154 days.

(21) Appl. No.: 18/920,348

(22) Filed: Oct. 18, 2024

(65) Prior Publication Data

US 2025/0131532 A1 Apr. 24, 2025

(30) Foreign Application Priority Data

Oct. 24, 2023 (KR) ........................ 10-2023-0143171

(51) Int. Cl.
*G06T 5/50* (2006.01)
*G06T 7/13* (2017.01)
(Continued)

(52) U.S. Cl.
CPC .................. *G06T 5/50* (2013.01); *G06T 7/13* (2017.01); *G06T 7/30* (2017.01); *G06T 7/90* (2017.01);
(Continued)

(58) Field of Classification Search
None
See application file for complete search history.

(56) References Cited

U.S. PATENT DOCUMENTS 12,495,191 B2 * 12/2025 Otsuki .................. H04N 23/10
2009/0256927 A1 10/2009 Komiya et al.
(Continued)

FOREIGN PATENT DOCUMENTS

EP 4096213 A1 11/2022
JP 4455386 B2 4/2010
(Continued)

OTHER PUBLICATIONS

Y. Qu, H. Qi, C. Kwan, N. Yokoya and J. Chanussot, "Unsupervised and Unregistered Hyperspectral Image Super-Resolution With Mutual Dirichlet-Net," in IEEE Transactions on Geoscience and Remote Sensing, vol. 60, pp. 1-18, 2022, Art No. 5507018, doi: 10.1109/TGRS.2021.3079518.

(Continued)

*Primary Examiner* — James A Thompson
(74) *Attorney, Agent, or Firm* — Sughrue Mion, PLLC

(57) ABSTRACT

An image acquisition device includes a first image sensor having a first spatial resolution and configured to acquire a first image based on a first wavelength band, a second image sensor having a second spatial resolution lower than the first spatial resolution and configured to acquire a second image based on a second wavelength band wider than the first wavelength band, and a processor configured to register the first image and the second image by using a relative position information between the first image sensor and the second image sensor; generate a third image, of which a color component is determined by replacing a color component of the first image with a color component of the second image; and generate a fourth image, of which a color component is determined by synthesizing the color component of the first image and the color component of the third image through alpha blending.

20 Claims, 25 Drawing Sheets

(51) Int. Cl.

| | |
|---|---|
| ***G06T 7/30*** | (2017.01) |
| ***G06T 7/90*** | (2017.01) |
| ***G06V 10/56*** | (2022.01) |
| ***G06V 10/60*** | (2022.01) |
| ***H04N 23/11*** | (2023.01) |

(52) U.S. Cl.
CPC .............. *G06V 10/56* (2022.01); *G06V 10/60* (2022.01); *H04N 23/11* (2023.01); *G06T 2207/20221* (2013.01)

(56) References Cited

U.S. PATENT DOCUMENTS

| | | | | |
|---|---|---|---|---|
| 2014/0218538 | A1 | 8/2014 | Choi | |
| 2019/0287229 | A1* | 9/2019 | Wang | A61B 1/00009 |
| 2022/0385864 | A1* | 12/2022 | Kim | H04N 23/951 |
| 2024/0273781 | A1* | 8/2024 | Yahata | G06T 11/10 |

FOREIGN PATENT DOCUMENTS

| | | | |
|---|---|---|---|
| JP | 2010-130157 | A | 6/2010 |
| KR | 10-1926489 | B1 | 12/2018 |
| KR | 10-2022-0159829 | A | 12/2022 |

OTHER PUBLICATIONS

B. Arbelot et al., "Automatic Texture Guided Color Transfer and Colorization", The Eurographics Association, Eurographics Proceedings, Expressive, 2016, 12 pages.
A. Chadha and Y. Andreopoulos, "Deep Perceptual Preprocessing for Video Coding," 2021 IEEE/CVF Conference on Computer Vision and Pattern Recognition (CVPR), 2021, pp. 14852-14861, doi: 10.1109/CVPR46437.2021.01461.
H. Han and K. Sohn, "Human perception inspired exposure correction using total variation model," TENCON 2009-2009 IEEE Region 10 Conference, 2009, pp. 1-6, doi: 10.1109/TENCON.2009.5396151.
Extended European Search Report issued Mar. 18, 2025 by the European Patent Office for EP Patent Application No. 24205858.4.
B. Arbelot et al., "Local texture-based color transfer and colorization", Virtual Special Section on Expressive 2016 Computers & Graphics, 62, pp. 15-27, Dec 2017, http://dx.doLorg/10.1016/j.cag.2016.12.005.

* cited by examiner

IMAGE ACQUISITION DEVICE AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2023-0143171, filed on Oct. 24, 2023, in the Korean Intellectual Property Office, the disclosure of which is incorporated by reference herein in its entirety.

BACKGROUND

1. Field

Example embodiments of the disclosure relate to an image acquisition device that provides an image with a wide color gamut and an electronic device including the same.

2. Description of the Related Art

Image sensors are devices that receive light incident from a subject and photoelectrically convert the received light to generate an electrical signal.

For color expression, image sensors typically use a color filter configured as an array of filter elements that selectively transmit red, green, and blue light, and sense the amount of light transmitted through each of the filter elements.

In such image acquisition, wavelength bands transmitted by the filter elements provided in the color filter are limited, which limits a color gamut for expressing a subject.

SUMMARY

One or more example embodiments of the disclosure provide an image acquisition device that provides an image with a wide color gamut and an electronic device including the same.

Additional aspects will be set forth in part in the description which follows and, in part, will be apparent from the description, or may be learned by practice of the presented embodiments of the disclosure.

According to an aspect of an example embodiment, an image acquisition device includes a first image sensor having a first spatial resolution and configured to acquire a first image based on a first wavelength band, a second image sensor having a second spatial resolution lower than the first spatial resolution and configured to acquire a second image based on a second wavelength band wider than the first wavelength band, and a processor configured to register the first image and the second image in association with each other, by using a relative position information between the first image sensor and the second image sensor; generate a third image, of which a color component is determined by replacing a color component of the first image with a color component of the second image; and generate a fourth image, of which a color component is determined by synthesizing the color component of the first image and the color component of the third image through alpha blending.

The processor may determine the color component of the fourth image by summing a value acquired by multiplying the color component of the first image by an alpha blending coefficient $\alpha$ and a value acquired by multiplying the color component of the third image by $(1-\alpha)$, and the alpha blending coefficient $\alpha$ may have a value between about 0 or more and about 1 or less.

The processor may calculate parameters for registering the first image and the second image based on at least one of the relative position information, a resolution, a field of view, or a focal length of each of the first image sensor and the second image sensor.

The third image may have the first spatial resolution and a color gamut that corresponds to a color gamut of the second image.

The processor may determine the color component of the third image by matching a color statistic of the first image with a color statistic of the second image.

The color statistic may correspond to an average value with respect to peripheral pixels adjacent to a central pixel.

The color statistic may correspond to a standard deviation value with respect to peripheral pixels adjacent to a central pixel.

The processor may calculate the average value by weighting a similarity between the central pixel and the peripheral pixels.

The processor may calculate the standard deviation value by weighting a standard deviation with a similarity between the central pixel and the peripheral pixels.

The similarity may be calculated by using, as feature vectors, a luminance value of the central pixel and luminance values of the peripheral pixels.

The processor may determine the alpha blending coefficient $\alpha$ as a logical sum of a first coefficient and a second coefficient, the first coefficient may represent information about an occlusion region according to a disparity between the first image and the second image, and the second coefficient may represent false color information of the color component of the third image.

The processor may set the first coefficient of a pixel of interest of the first image to 1 when no pixel of the second image corresponds to the pixel of interest pixel of the first image, and set the first coefficient to 0 when at least one pixel of the second image corresponds to the pixel of interest pixel of the first image.

The processor may determine a greater value among the first coefficient and the second coefficient as a value of the alpha blending coefficient $\alpha$.

The second coefficient may be proportional to a color difference between the first image and the third image and has a value between about 0 or more and about 1 or less.

The second coefficient may have a value closer to 0 as a saturation of the first image increases, or closer to 1 as the saturation of the first image decreases.

The processor may set the second coefficient based on a difference in luminance values between corresponding pixels of the first image and the second image, such that the second coefficient is closer to 1 as the difference increases or closer to 0 as the difference decreases.

The processor may separate the first image and the second image into a luminance component and a color component, respectively, and generate the third image and the fourth image by using the separated first image and the separated second image.

The processor may register the first image and the second image by extracting at least one of an edge feature or a corner feature from the first image and the second image, and matching the extracted at least one of the edge feature or the corner feature between the first image and the second image.

According to an aspect of an example embodiment, an electronic device including the foregoing image acquisition device.

According to an aspect of an example embodiment, a method of controlling an image acquisition device includes acquiring a first image from a first image sensor and acquiring a second image from a second image sensor; registering the acquired first image and the acquired second image in association with each other; generating a third image, of which a color component is determined by replacing a color component of the first image with a color component of the second image; and generating a fourth image, of which a color component is determined by synthesizing the color component of the first image and the color component of the third image through alpha blending.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
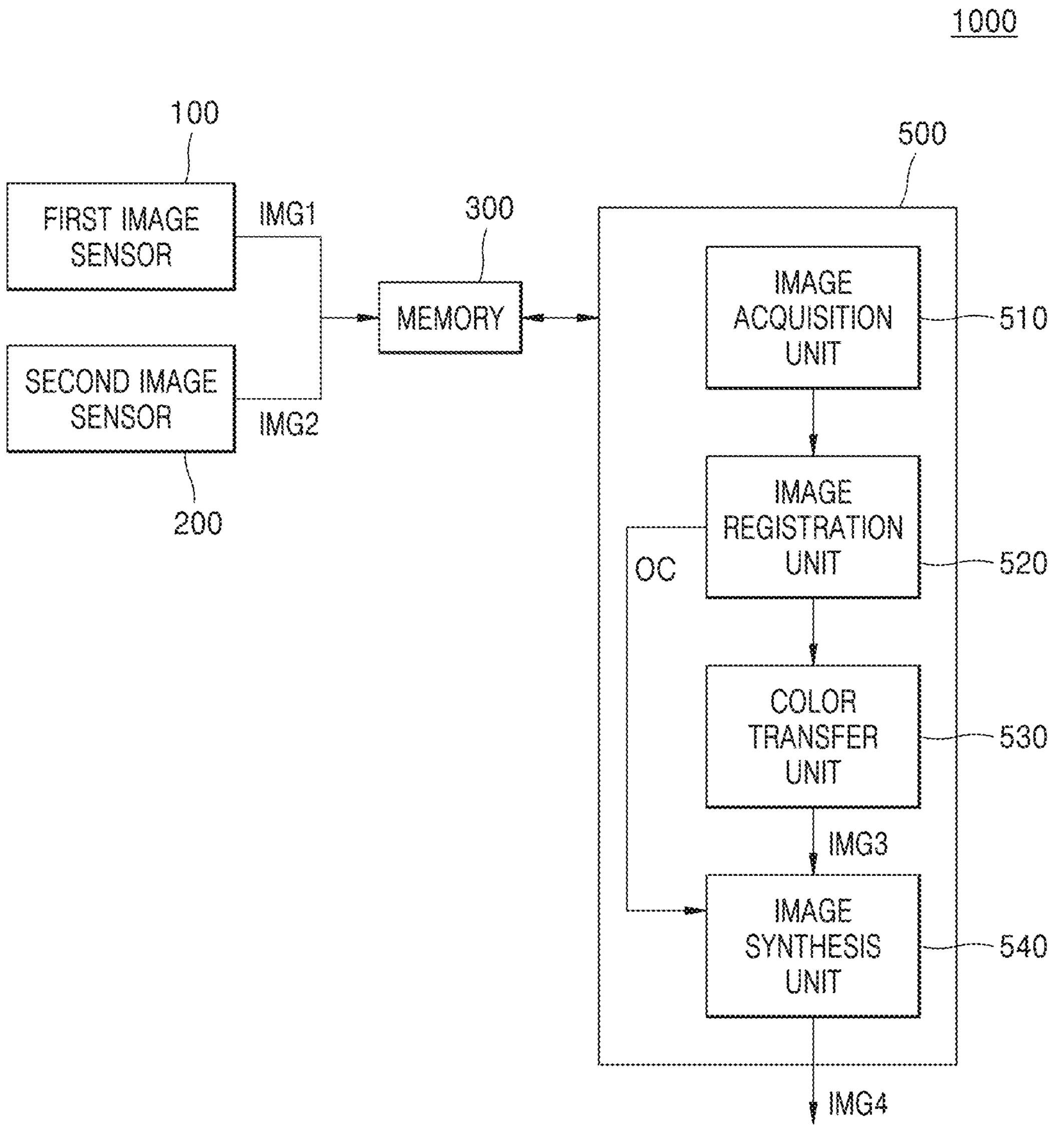
FIG. 1 is a block diagram showing a schematic structure of an image acquisition device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiment will be described in detail with reference to the accompanying drawings. The example embodiments of the disclosure may be variously modified and may be embodied in many different forms. In the following drawings, like reference numerals refer to like components, and the size of each component in the drawings may be exaggerated for clarity and convenience of description.

Hereinafter, what is described as "upper" or "on" may include those directly above in contact, as well as above in non-contact.

The terms such as "first" or "second" used herein may be used to describe various components, but may be used for the purpose of distinguishing one component from another component. These terms do not limit the difference in the material or structure of the components.

The singular forms are intended to include the plural forms as well, unless the context clearly indicates otherwise. When a part "comprises" or "includes" a component in the specification, unless otherwise defined, it is not excluding other components but may further include other components.

Also, in the specification, the term "unit" or "module" denote a unit or a module that processes at least one function or operation, and may be implemented by hardware, software, or a combination of hardware and software.

The term "above" and similar directional terms may be applied to both singular and plural.

In the disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms. It will also be appreciated that one or more features included in one embodiment can be combined with one or more features included in other embodiments.

Operations of a method described herein may be performed in any suitable order unless explicitly stated that they must be performed in the order described. In addition, the use of all exemplary terms (e.g., etc.) is merely for describing the technical idea in detail, and unless explicitly limited by the claims, the scope of rights is not limited by these terms.

Figure 2:
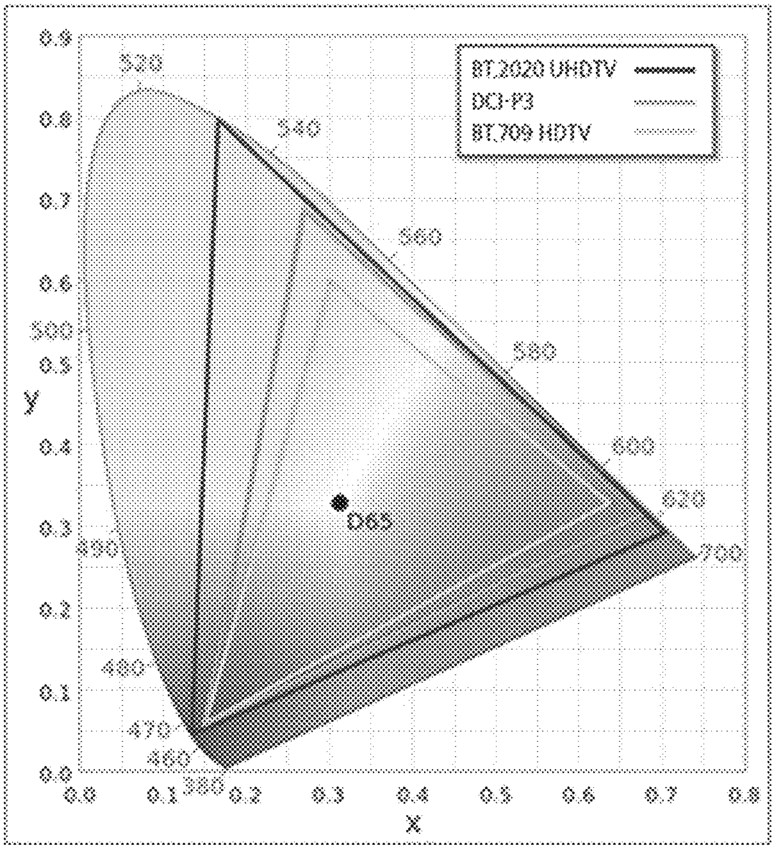
FIG. 2 is a color coordinate explaining a color gamut represented by an image acquired by an image acquisition device according to an example embodiment.

FIG. 1 is a block diagram showing a schematic structure of an image acquisition device 1000 according to an example embodiment. FIG. 2 is an example of a color coordinate explaining a color gamut represented by an image acquired by the image acquisition device 1000 according to an example embodiment.

The image acquisition device 1000 includes a first image sensor 100 that acquires a first image IMG1 based on M (M being an integer) spectral bands, a second image sensor 200 that acquires a second image IMG2 based on N spectral bands, N being an integer greater than M, and a processor 500 that performs signal processing on the first image IMG1 and the second image IMG2 to form (or generate) a third image IMG3 and synthesize the first image IMG1 and the third image IMG3 to form (or generate) a fourth image IMG4.

The first image sensor 100 is a sensor employed in a general RGB camera, and may be a complementary metal oxide semiconductor (CMOS) image sensor using a Bayer color filter array. The first image IMG1 acquired by the first image sensor 100 may be a red, green, and blue (RGB)-based image, and may have a color gamut range acquired by the general RGB camera. For example, the first image IMG1 may have a standard RGB (s-RGB) color gamut, a BT.709 color gamut, a DCI-P3 color gamut, or an Adobe RGB color gamut. FIG. 2 illustrates the BT.709 color gamut and the DCI-P3 color gamut as examples.

The second image sensor 200 is a sensor that senses light of more types of wavelengths than the first image sensor 100. The second image sensor 200 may use, for example, 16 channels, or 31 channels, or another number of channels. A bandwidth of each channel may be set to be narrower than each of R, G, and B bands, and a total bandwidth which is the sum of bandwidths of all channels may include an RGB bandwidth, that is, a visible light bandwidth, and be wider than the RGB bandwidth. For example, the sum of bandwidths of all channels of the second image sensor 200 may correspond to a bandwidth of about 350 nm to about 1000 nm (see e.g., FIG. 9). The second image IMG2 acquired by the second image sensor 200 may be a hyperspectral image, and may be a wavelength-based image including a wider wavelength band than the RGB wavelength band, for example, the visible light band, and may further include an ultraviolet or infrared wavelength band which is wider than the visible light band by using 16 or more channels. The second image IMG2 may be an image acquired using all available channels of the second image sensor 200, or may be an image acquired by selecting a specific channel. A spatial resolution of the second image IMG2 may be lower than that of the first image IMG1, but embodiments of the disclosure are not limited thereto.

The first image sensor 100 and the second image sensor 200 may be configured as separate chips or a single chip.

The first image IMG1 and the second image IMG2 respectively acquired by the first image sensor 100 and the second image sensor 200 may be stored in a memory 300. The memory 300 may be a line memory that stores the first image IMG1 and the second image IMG2 in a line unit, or may be a frame buffer that entirely stores the first image IMG1 and the second image IMG2. The memory 300 may use a static random access memory (SRAM) or a dynamic random access memory (DRAM). The memory 300 may be located outside each of the first image sensor 100 and the second image sensor 200, or may be integrated into each of the first image sensor 100 and the second image sensor 200. When integrated into each of the first image sensor 100 and the second image sensor 200, the memory 300 may be integrated together with a sensor circuit. In this regard, a pixel part as one part, and a circuit part and the memory 300, as the other part, may be configured as separate stacks and integrated into 2 stacks to form one chip. Alternatively, according to a configuration, 3-D stacking with three layers of a pixel part, a circuit part, and the memory 300 is also possible.

The processor 500 uses the first image IMG1 as an input image and the second image IMG2 as a reference image to form the third image IMG3. The third image IMG3 has a spatial resolution corresponding to the first image IMG1 by the first image sensor 100 and a color gamut corresponding to the second image IMG2 by the second image sensor 200. The third image IMG3 may have the same spatial resolution as the first image IMG1 and also have an expanded color gamut, for example, a color gamut range of DCI-P3 or more in FIG. 2.

The third image IMG3 may be acquired by replacing a color component of the first image IMG1 with a color component of the second image IMG2. To this end, corresponding relationships between pixels of the first image IMG1 and pixels of the second image IMG2 may be identified by image registering the first image IMG1 and the second image IMG2 on a two-dimensional plane.

The processor 500 may form the fourth image IMG4 by combining the first image IMG1 and the third image IMG3 through alpha blending. The fourth image IMG4 may have the same spatial resolution as the first image IMG1, and also have an expanded color gamut, for example, the color gamut range of DCI-P3 or more in FIG. 2.

An image processing process of the processor 500 is described in more detail as follows.

Referring back to FIG. 1, the processor 500 may include an image acquisition unit 510, an image registration unit 520, a color transfer unit 530, and an image synthesis unit 540. For convenience of explanation, the image acquisition unit 510, the image registration unit 520, the color transfer unit 530, and the image synthesis unit 540 are described according to operations of the processor 500, but this division does not necessarily mean that the image acquisition unit 510, the image registration unit 520, the color transfer unit 530, and the image synthesis unit 540 are physically separated. The image acquisition unit 510, the image registration unit 520, the color transfer unit 530, and the image synthesis unit 540 may correspond to any combination of hardware and/or software included in the processor 500, and may be physically the same or different from each other.

The image acquisition unit 510 may acquire an image from each of the first image sensor 100 and the second image sensor 200, and then perform basic image processing before or after storing the image in the memory 300. For example, the image acquisition unit 510 may perform bad pixel correction, fixed pattern noise correction, crosstalk reduction, remosaicing, demosaicing, false color reduction, denoising, chromatic aberration correction, etc. In addition, the image acquisition unit 510 may perform the same image processing on images from the first image sensor 100 and the second image sensor 200, or may differently perform image processing on images from the first image sensor 100 and the second image sensor 200.

The image acquisition unit 510 may apply demosaicing to interpolate a raw image of each of the first image IMG1 and the second image IMG2 each having one channel into an RGB image and a multi-channel spectral image, respectively. In addition, the image acquisition unit 510 may convert the first image IMG1, which is an RGB image, and the second image IMG2, which is a multi-channel spectral image, into a three-channel XYZ color space through image domain conversion processing. In order to accurately transfer color information of the second image IMG2 to the first image IMG1, the image acquisition unit 510 may normalize a luminance of the second image IMG2 with respect to the first image IMG1.

The image registration unit 520 may use relative position information between the first image sensor 100 and the second image sensor 200 to register the first image IMG1 and the second image IMG2. The image registration unit 520 may determine a positional relationship between pixels of the image acquired from each of the first image sensor 100 and the second image sensor 200 by considering a spatial resolution of the image, a field of view of an optical system used to acquire the image, a focal length, etc. At this time, the image registration unit 520 may overlay an image of one sensor (e.g., the first image of the first image sensor) on an image of another sensor (e.g., the second image of the second image sensor). For example, the image registration unit 520 may retrieve pixels of the second image IMG2 corresponding to each pixel of the first image IMG1 with respect to the first image IMG1 acquired by the first image sensor 100. To this end, the image registration unit 520 may perform processing such as scaling, translation, rotation, affine transform, perspective transform, etc. on the pixel of the second image IMG2.

One or more pixels of the second image IMG2 may correspond to a pixel of the first image IMG1. When a plurality of pixels of the second image IMG2 correspond to a pixel of the first image IMG1, the image registration unit 520 may calculate a pixel value of the second image IMG2 corresponding to the pixel of the first image IMG1 through a weighted sum of the plurality of pixels of the second image IMG2 according to positions of the plurality of pixels.

There may be no pixel of the second image IMG2 that corresponds to a pixel of the first image IMG1. This is possible due to a disparity between the first image sensor 100 and the second image sensor 200, and when there is no corresponding pixel in the second image IMG1 for a pixel of the first image IMG1, the image registration unit 520 may determine such pixel of the first image IMG to be an occlusion region. The image registration unit 520 may store information about the pixel determined to be the occlusion region in a form of a map. In an embodiment, the image registration unit 520 may generate an occlusion map by setting a value of the corresponding pixel to 1 when there is no corresponding pixel between the first image IMG1 and the second image IMG2, and by setting a value of the corresponding pixel to 0 when there is a corresponding pixel between the first image IMG1 and the second image IMG2.

The image registration unit 520 may perform registration in a sub-pixel unit to increase registration precision. In an embodiment, in registration of the sub-pixel unit, a position of a pixel may be expressed as a real number rather than an integer.

The image registration unit 520 may also increase registration efficiency by allowing the first image sensor 100 and the second image sensor 200 to focus on a subject at the same position through focus control. In addition, the image registration unit 520 may quickly and accurately perform image registration by ensuring that two sensors have the same field of view. For example, when imaging optical systems for forming optical images on the first image sensor 100 and the second image sensor 200 have the same focal length and the same field of view, only translation exists between the first image IMG1 and the second image IMG2, and related parameters may be calculated using relative positions between the first image sensor 100 and the second image sensor 200 and focal lengths of the imaging optical systems.

Before performing registration, the image registration unit 520 may correct aberrations included in the first image IMG1 and the second image IMG2. That is, the image registration unit 520 may perform registration after correcting effects of distortion, geometric aberration, chromatic aberration, etc. caused by lenses included in the imaging optical systems used when acquiring the first image IMG1 and the second image IMG2.

The image registration unit 520 may extract edge feature information within an image and match features between two images by using the edge feature information. When image registration is misaligned in an edge region of a subject, a color distortion may occur. Thus, the image registration unit 520 may extract edge information of two images and perform registration of the two images based on matching between the edge information thereof such that edges in the two images are aligned to prevent distortion from occurring in the edge region. In an embodiment, the image registration unit 520 may perform image registration using other image features such as corner features (or corner points), in addition to or alternative to the edge.

The color transfer unit 530 may use the first image IMG1 as an input image and the second image IMG2 as a reference image to change a color of the first image IMG1 to match a color of the second image IMG2 (that is, replacing a color component of the first image IMG1 with a color component of the second image IMG2) and form the third image IMG3 based thereon. In an embodiment, the color transfer unit 530 may form (or determine) a color component of the third image IMG3 by matching a color statistic of the first image IMG1 with a color statistic of the second image IMG2. The color statistic may be based on an average value with respect to peripheral pixels adjacent to a central pixel and/or a standard deviation value with respect to the peripheral pixels adjacent to the central pixel.

The color transfer unit 530 may form the third image IMG3 by respectively separating the first image IMG1 and the second image IMG2 into a luminance component and a color component. For example, the color transfer unit 530 may form the color component of the third image IMG3 by changing the color of the first image IMG1 to match the color of the second image IMG2 in a CIE LAB color space having a high independence of the luminance component and the color component, and form (or determine) a luminance component of the third image IMG3 by using the luminance component of the first image IMG1 as it is.

In an embodiment, the color transfer unit 530 may form the third image IMG3 using a color transfer function expressed in Equations 1 and 2 below.

First, the luminance component $IMG3_L(p)$ of the third image IMG3 may use a luminance component value $IMG1_L(p)$ of the first image IMG1 as shown in Equation 1 below.

$$IMG3_L(p) = IMG1_L(p) \quad \text{[Equation 1]}$$

Next, the color component of the third image IMG3 may be independently defined as follows using statistics of peripheral pixels q adjacent to a central pixel p with respect to a color component $\{IMG3_a(p), IMG3_b(p)\}$ in the central pixel p.

In an embodiment, the color component $IMG3_c(p)$ of the third image IMG3 may be calculated through Equation 2 below.

$$IMG3_C(p) = \frac{STD2_C(p)}{STD1_C(p)}(IMG1_C(p) - \mu1_C(p)) + \mu2_C(p), \quad C \in \{a, b\} \qquad \text{[Equation 2]}$$

Here, "μ" is an average weighted by a similarity of the central pixel "p" and the peripheral pixels "q" surrounding the central pixel p, and "STD" is a standard deviation weighted by the similarity of the central pixel "p" and the peripheral pixels "q" surrounding the central pixel p. Equation 2 may be interpreted as a process of replacing a statistic $\{\mu1_c(p), STD1_C(p)\}$ in the periphery of the central pixel p of the first image IMG1 with a statistic $\{\{\mu2_c(p), STD2_C(p)\}$ of the second image IMG2.

The statistic $\{\mu_c(p), STD_C(p)\}$ may be calculated as shown in Equations 3 and 4 below.

$$\mu1_C(p) = \frac{1}{|\omega|}\sum_{q\in\omega_p} IMG1_C(q)\mathcal{D}_\sigma(p, q) \qquad \text{[Equation 3]}$$

$$\mu2_C(p) = \frac{1}{|\omega|}\sum_{q\in\omega_p} IMG2_C(q)\mathcal{D}_\sigma(p, q)$$

$$STD1_C(p) = \sqrt{\frac{1}{|\omega|}\sum_{q\in\omega_p} (IMG1_C(q) - \mu1_C(p))^2\mathcal{D}_\sigma(p, q)} \qquad \text{[Equation 4]}$$

$$STD2_C(p) = \sqrt{\frac{1}{|\omega|}\sum_{q\in\omega_p} (IMG2_C(q) - \mu2_C(p))^2\mathcal{D}_\sigma(p, q)}$$

Here, $\omega_p$ is a peripheral region set with respect to the central pixel p and may have a square window. Alternatively, the peripheral region may have another shape of a region. $\omega_p$ may be the peripheral region set adjacent to the central pixel p with respect to the central pixel p. $|\omega|$ means the number of pixels of the peripheral region set $\omega_p$, and in an embodiment, when $\omega_p$ is the peripheral region set adjacent to the central pixel p and has a square window, $|\omega|$ may be 8. $D_c(p,q)$ is a Gaussian kernel that represents a similarity between the central pixel p and the peripheral pixels q.

The average μ and the standard deviation STD used in a transfer function (e.g., as expressed in Equation 2) to determine the color component of the third image IMG3 may be calculated by weighting the similarity of the central pixel p and the peripheral pixels q, and thus, the transfer function (e.g., Equation 2) for determining the color component of the third image IMG3 may depend on similar pixels between the first image IMG1 and the second image IMG2.

$D_\sigma(p,q)$, which represents the similarity between the central pixel p and the peripheral pixels q, may be calculated as shown in Equation 5 below.

$$\mathcal{D}_\sigma(p, q) = \exp\left(-\frac{\|\mathcal{S}(p) - \mathcal{S}(q)\|^2}{2\sigma^2}\right) \qquad \text{[Equation 5]}$$

Here, $\sigma^2$ is a hyperparameter that represents smoothness of a kernel. In an example embodiment, a feature quantity vector $\mathcal{S}(p)$ may use a luminance value of a simple vector as a feature vector. When the luminance value is used as the feature vector, an amount of similarity calculation may be reduced. However, the embodiments of the disclosure are not limited thereto, and any value may be used as long as the feature quantity vector $\mathcal{S}(p)$ is a real number vector corresponding to the similarity of pixels.

The image synthesis unit 540 may form (or determine) the color component of the fourth image IMG4 by synthesizing the color component of the first image IMG1 and the color component of the third image IMG3 through alpha blending.

A luminance component $IMG4_L(p)$ of the fourth image IMG4, like the luminance component $IMG3_L(p)$ of the third image IMG3, may use the luminance component value $IMG1_L(p)$ of the first image IMG1 as it is (see Equation 1).

A transfer function to determine a color component $IMG4_C(p)$ of the fourth image IMG4 may be expressed as Equation 6 below.

$$IMG4_C(p) = \alpha(p)IMG1_C(p) + (1 - \alpha(p))IMG3_C(p), \quad C \in [a, b] \qquad \text{[Equation 6]}$$

The image synthesis unit 540 may determine the color component $IMG4_C(p)$ of the fourth image IMG4 by summing a value acquired by multiplying the color component of the first image IMG1 by an alpha blending coefficient α and a value acquired by multiplying the color component of a third image IMG3 by (1−α). The alpha blending coefficient α may have a value between about 0 or more and about 1 or less.

The image synthesis unit 540 may determine a value of the alpha blending coefficient α by logical sum of a first coefficient $\alpha_1$ and a second coefficient $\alpha_2$. In an embodiment, the image synthesis unit 540 may set a greater value among the first coefficient $\alpha_1$ and the second coefficient $\alpha_2$ as the value of the alpha blending coefficient α. This may be expressed as shown in Equation 7 below.

$$\alpha(p) = \max(\alpha_1(p), \alpha_2(p)) \qquad \text{[Equation 7]}$$

The first coefficient $\alpha_1$ may be a parameter related to the occlusion region that is determined due to the disparity between the first image IMG1 and the second image IMG2.

The image synthesis unit 540 may receive information OC about the occlusion region from the image registration unit 520. As described above, when no pixel of the second image IMG2 corresponds to the pixel of the first image IMG1, the image registration unit 520 may determine the corresponding pixel of the first image IMG1 to be the occlusion region. The image registration unit 520 may store information about the pixel determined to be the occlusion region in a form of a map. In an embodiment, the image registration unit 520 may generate an occlusion map by setting a value of the corresponding pixel to 1 when there is no corresponding pixel in the second image IMG2, and by setting a value of the corresponding pixel to 0 when there is a corresponding pixel in the second image IMG2. As a result, the first coefficient $\alpha_1$ may have a value of 1 when the pixel corresponds to the occlusion region (that is, when there is no corresponding pixel between the first image IMG1 and the second image IMG2), and have a value of 0 when the pixel does not correspond to the occlusion region (that is, when there is a corresponding pixel between the first image IMG1 and the second image IMG2).

The second coefficient $\alpha_2$ may be a parameter related to false color information of the third image IMG3. The second image sensor 200 may sense relatively more wavelength channels than the first image sensor 100. Accordingly, a distance between pixels of the same wavelength channel in the second image sensor 200 may be greater than a distance between pixels of the same wavelength channel in the first image sensor 100 (for example, see FIGS. 6 and 10). As a result, the second image sensor 200 may generate incorrect color information, that is, false color information, during demosaicing.

The image synthesis unit 540 may set the second coefficient $\alpha_2$ to be proportional to a color difference between the first image IMG1 and the third image IMG3 and have a value between about 0 or more and about 1 or less.

In addition, the image synthesis unit 540 may determine the second coefficient $\alpha_2$ based on a difference in luminance values between corresponding pixels of the first image IMG1 and the second image IMG2. This is based on the empirical fact that the false color information is especially prominent in a region with a large difference in luminance values between the corresponding pixels of the first image IMG1 and the second image IMG2. Therefore, the image synthesis unit 540 may set the second coefficient $\alpha_2$ to be proportional to the difference in luminance values between the corresponding pixels of the first image IMG1 and the second image IMG2 and have a value between about 0 or more and about 1 or less. In an embodiment, the image synthesis unit 540 may set the second coefficient $\alpha_2$ to be closer to 1 as the difference in luminance values between the corresponding pixels of the first image IMG1 and the second image IMG2 increases, and to be closer to 0 as the difference decreases.

In addition, the image synthesis unit 540 may set the second coefficient $\alpha_2$ to be closer to 0 as a saturation of the first image IMG1 increases, and to be closer to 1 as the saturation of the first image IMG1 decreases. This is based on the empirical fact that the false color information is especially prominent in an achromatic region. An example of a method performed by the image synthesis unit 540 of setting the second coefficient $\alpha_2$ is as shown in Equation 8 below.

$$\alpha_2(p) = \mathrm{clip}(k_1 \cdot \Delta C(p) \cdot (1 - k_2 S1(p)), [0, 1]) \quad \text{[Equation 8]}$$

A clip function checks whether an input value is between 0 and 1, and when the input value is less than 0, outputs 0, and when the input value is greater than 1, outputs 1. As a result, the clip function sets the second coefficient $\alpha_2$ to have a value between about 0 or more and about 1 or less. $\Delta C(p)$ is a color difference value between the first image IMG1 and the third image IMG3. S1($p$) is a saturation value indicating sharpness of the color component of the first image IMG1. $k_1$ and $k_2$ are each a heuristic hyperparameter.

In an example embodiment, the image synthesis unit 540 may form (or generate) a final output image by converting the luminance component IMG4$_L$(p) of the fourth image IMG4 and the color component IMG4$_C$(p) of the fourth image IMG4 into an RGB image through image domain conversion processing.

As described above, the image acquisition device 1000 according to the embodiment may use the first image IMG1 with a high spatial resolution captured by the first image sensor 100 as an input image and the second image IMG2 with a wide color gamut captured by the second image sensor 200 as a reference image to transfer the color information of the second image IMG2 to the first image IMG1, thereby forming the final image having the high spatial resolution of the first image IMG1 and the wide color gamut of the second image IMG2.

Color information transfer is implemented by matching (or replacing) the color statistic of the first image IMG1 with the color statistic of the second image IMG2.

In addition, the image acquisition device 1000 may synthesize the first image and an intermediate image (third image) through alpha blending to form a final image (fourth image). To perform alpha blending, the image acquisition device 1000 may determine the alpha blending coefficient $\alpha$ as the logical sum of the first coefficient $\alpha_1$ which is a parameter related to the occlusion region and the second coefficient $\alpha_2$ which is a parameter related to the false color information of the intermediate image (third image) to correct an incorrect color information transfer and form the final image (fourth image).

Figure 3:
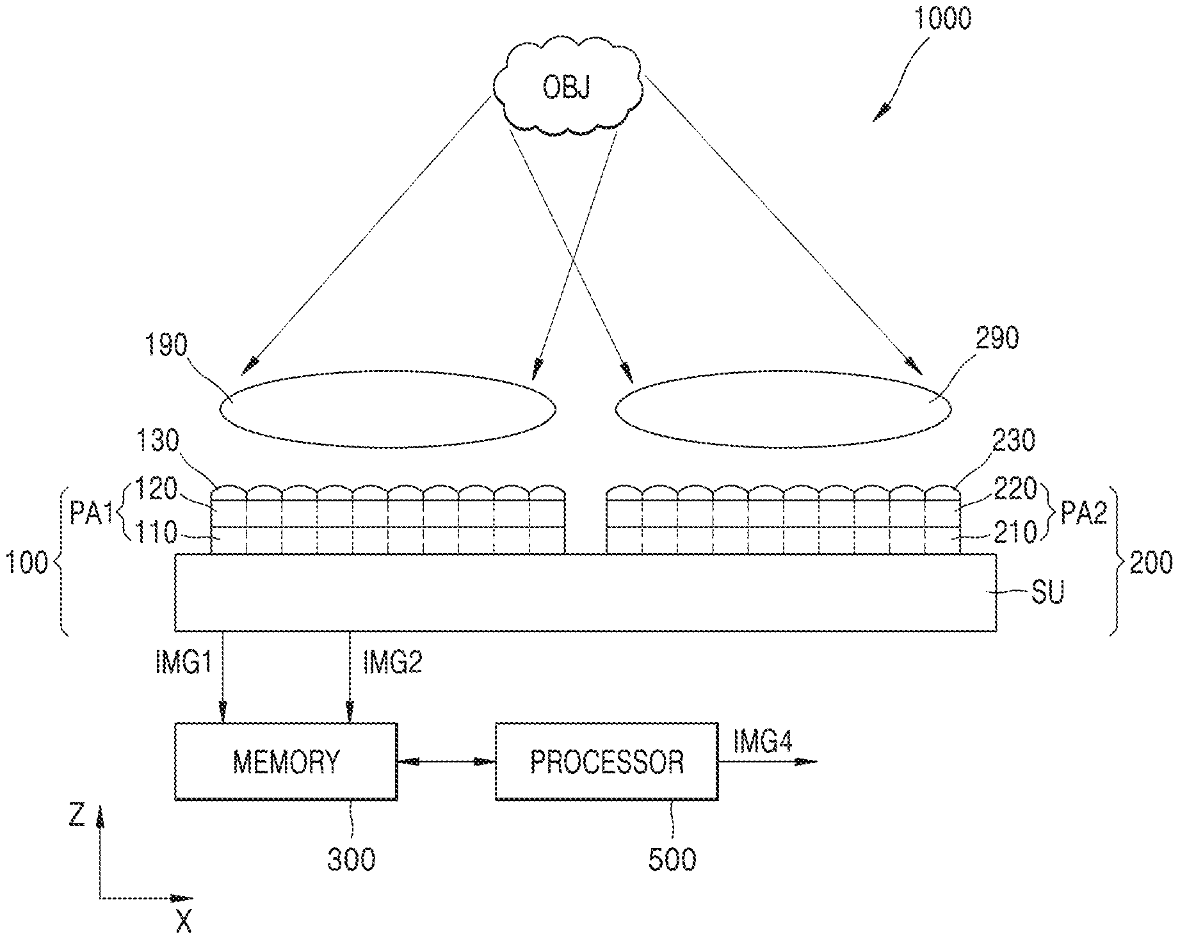
FIG. 3 is a conceptual diagram showing a schematic structure of an image acquisition device according to an example embodiment.
Figure 4:
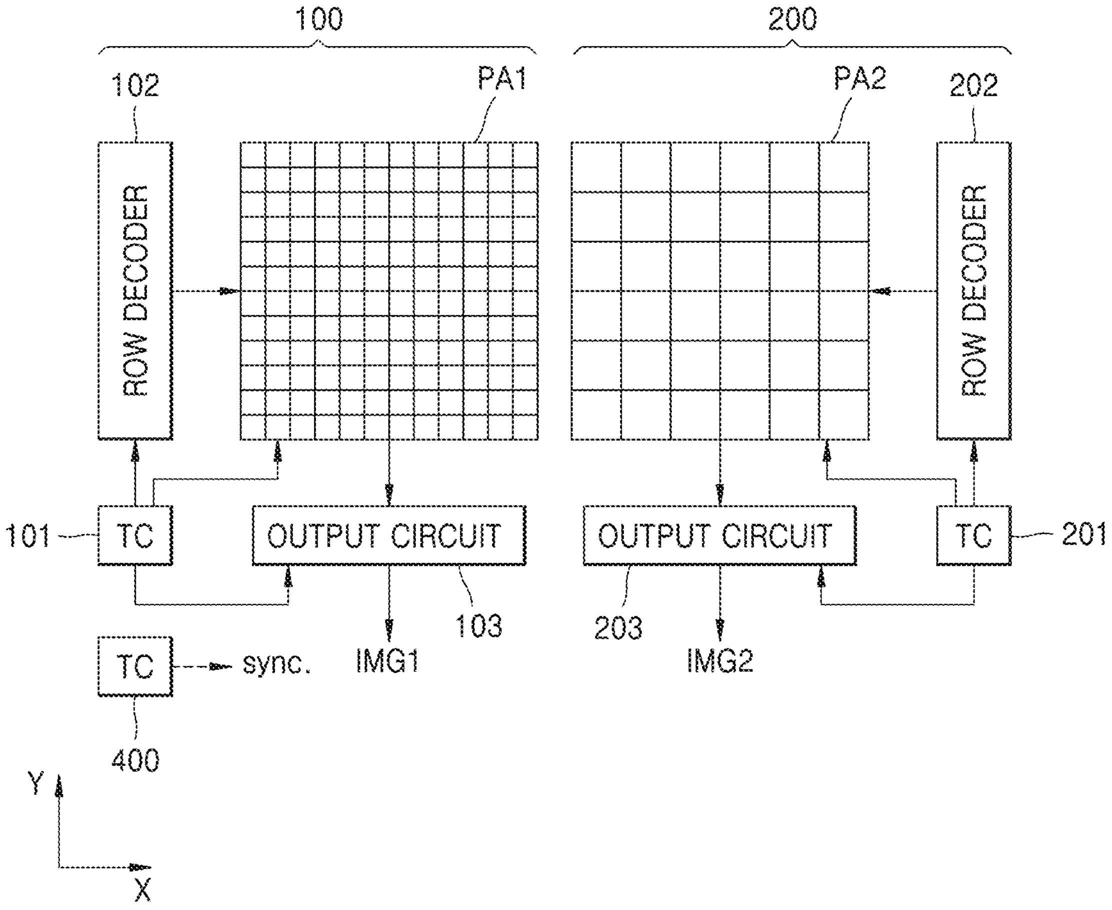
FIG. 4 shows a circuit configuration of a first image sensor and a second image sensor, provided in an image acquisition device, according to an example embodiment.

FIG. 3 is a conceptual diagram showing a schematic structure of the image acquisition device 1000 according to an example embodiment. FIG. 4 shows a circuit configuration of the first image sensor IMG1 and the second image sensor IMG2 provided in the image acquisition device 1000 according to an example embodiment.

The image acquisition device 1000 may include the first image sensor 100 that acquires the first image IMG1 based on a first wavelength band, the second image sensor 200 that acquires the second image IMG2 based on a second wavelength band that is wider than the first wavelength band, and the processor 500 that performs signal processing on the first image IMG1 and the second image IMG2 to form the fourth image IMG4. The image acquisition device 1000 may further include the memory 300 that stores data related to the first image IMG1 and the second image IMG2.

The image acquisition device 1000 may also include a first imaging optical system 190 that forms an optical image of an object OBJ on the first image sensor 100, and a second imaging optical system 290 that forms an optical image of the object OBJ on the second image sensor 200. FIGS. 3 and 4 show that the first imaging optical system 190 and the second imaging optical system 290 each include one lens, but this is an example and is not limited thereto. The first imaging optical system 190 and the second imaging optical system 290 may be configured to have the same focal length and the same field of view. When the first imaging optical system 190 and the second imaging optical system 290 are configured to have the same focal length and the same field of view, a process of registering the first image IMG1 and the second image IMG2 may be easier to form the third image IMG3 and the fourth image IMG4. However, the embodiments of the disclosure are not limited thereto.

The first image sensor 100 may include a first pixel array PA1. The first pixel array PA1 may include a first sensor layer 110 in which a plurality of first sensing elements are arrayed, and a color filter 120 disposed on the first sensor layer 110. The color filter 120 may include red filters, green filters, and blue filters which are alternately arranged. A first micro lens array 130 may be disposed on the first pixel array PA1. Various examples of a pixel arrangement applied to the first pixel array PA1 will be described with reference to FIGS. 5 to 8.

The second image sensor 200 may include a second pixel array PA2. The second pixel array PA2 may include a second sensor layer 210 in which a plurality of second sensing elements are arrayed, and a spectral filter 220 disposed on the second sensor layer 210. The spectral filter 220 may include a plurality of filter groups. Each of the plurality of filter groups may include a plurality of unit filters having different transmission wavelength bands. The spectral filter 220 may be configured to subdivide and filter a wider wavelength band than that of the color filter 120, for example, filter a wavelength band including a wavelength band of an ultraviolet to infrared wavelength range. A second micro lens array 230 may be disposed on the second pixel array PA2. Various examples of a pixel arrangement applied to the second pixel array PA2 will be described with reference to FIGS. 10 to 12.

The first sensor layer 110 and the second sensor layer 210 may each include, but are not limited to, a charge coupled device (CCD) sensor or a CMOS sensor.

The first pixel array PA1 and the second pixel array PA2 may be disposed to be spaced apart horizontally, for example, in an X direction, on the same circuit substrate SU.

First circuit elements that process signals from the first sensor layer 110 and second circuit elements that process signals from the second sensor layer 210 may be provided in the circuit substrate SU. However, the first and second circuit elements are not limited thereto, and may be respectively provided on separate substrates.

The memory 300 that stores data of the first image IMG1 and the second image IMG2 may be separately provided from the circuit substrate SU, but this is an example, and the memory 300 may be disposed within the circuit substrate SU in the same layer as or a separate layer from the circuit elements. The memory 300 may be a line memory that stores the first image IMG1 and the second image IMG2 in a line unit, or may be a frame buffer that entirely stores the first image IMG1 and the second image IMG2. The memory 300 may use, for example, an SRAM or a DRAM.

Various circuit elements used in the image acquisition device 1000 may be integrated into and disposed in the circuit substrate SU. For example, a logic layer including various analog circuits and digital circuits, and a memory layer which stores data may be provided in the circuit substrate SU. The logic layer and the memory layer may each include different layers or the same layer.

Referring to FIG. 4, a row decoder 102, an output circuit 103, and a timing controller (TC) 101 may be connected to the first pixel array PA1. The row decoder 102 may select one of rows of the first pixel array PA1 in response to a row address signal output from the TC 101. The output circuit 103 may output a light sensitive signal in a column unit from a plurality of pixels disposed along the selected row. To this end, the output circuit 103 may include a column decoder and an analog to digital converter (ADC). For example, the output circuit 103 may include a plurality of ADCs disposed for each column between the column decoder and the first pixel array PA1, or one ADC disposed in an output terminal of the column decoder. The TC 101, the row decoder 102, and the output circuit 103 may be implemented as one chip or as separate chips. At least some of the illustrated circuit elements may be provided in the circuit substrate SU of FIG. 3. A processor for processing the first image IMG1 output through the output circuit 103 may be implemented as a single chip along with the TC 101, the row decoder 102, and the output circuit 103.

A row decoder 202, an output circuit 203, and a TC 201 may be connected to the second pixel array PA2, and a signal from the second pixel array PA2 may be processed similarly as described above. In addition, a processor for processing the second image IMG2 output through the output circuit 203 may be implemented as a single chip along with the TC 201, the row decoder 202, and the output circuit 203.

The first pixel array PA1 and the second pixel array PA2 are illustrated to have different pixel sizes and numbers, but this is an example and embodiments of the disclosure are not limited thereto.

When operating two different types of sensors, timing control may be needed depending on different resolutions and output speeds, and the size of a region subject to image registration. For example, when one image string corresponding to a region is readout with respect to the first image sensor 100, an image string of the second image sensor 200 corresponding to the region may already be stored in a buffer or may need to be read anew. It is needed to correctly calculate such timing and performing readout according to the calculated timing. Alternatively, operations of the first image sensor 100 and the second image sensor 200 may be synchronized by using the same synchronization signal. For example, a TC 400 may be further provided to transmit a synchronization signal sync to each of the first image sensor 100 and the second image sensor 200.

Figure 5:
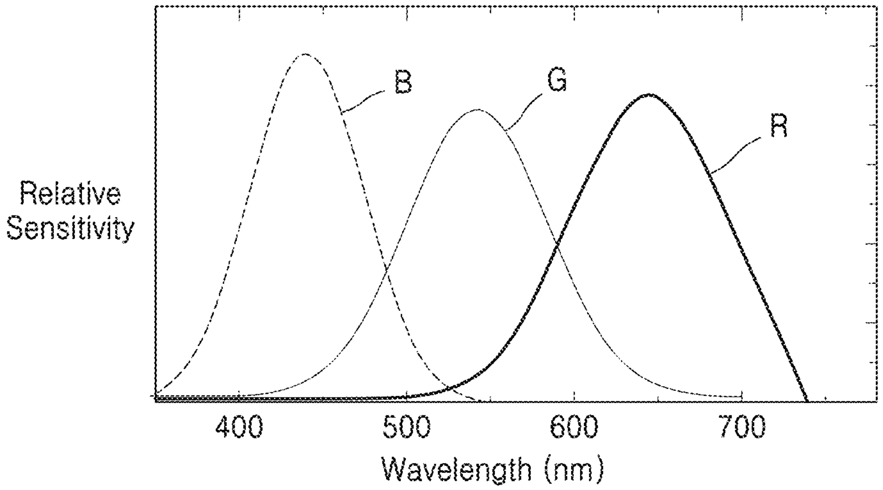
FIG. 5 shows a wavelength spectrum of a first image sensor provided in an image acquisition device according to an example embodiment.
Figure 6:
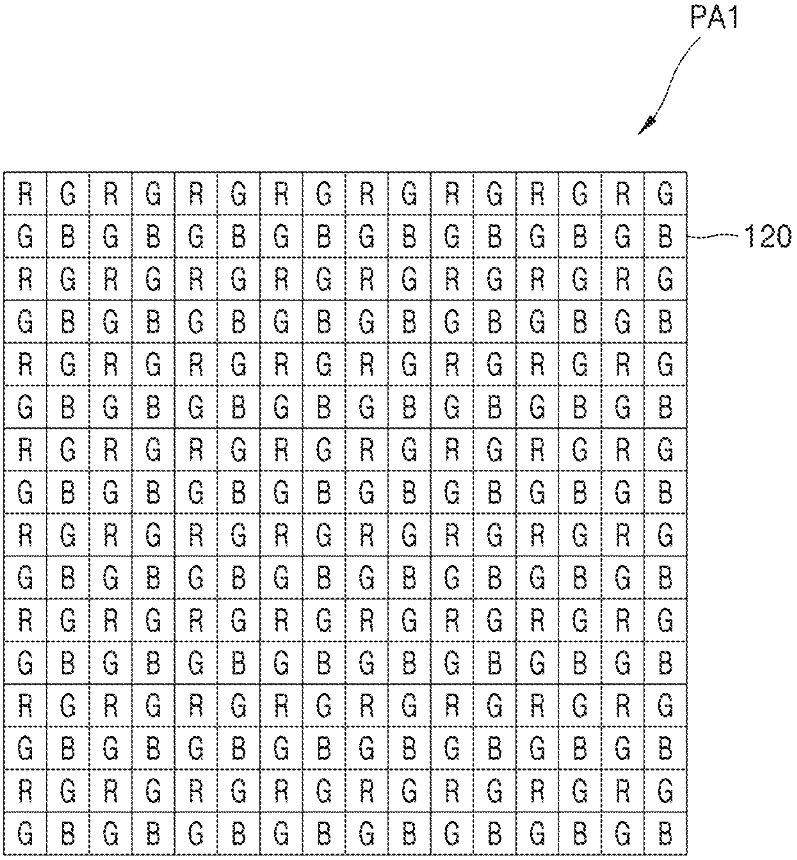
FIGS. 6 to 8 show pixel arrangements of a first image sensor provided in an image acquisition device according to an example embodiment.
Figure 7:
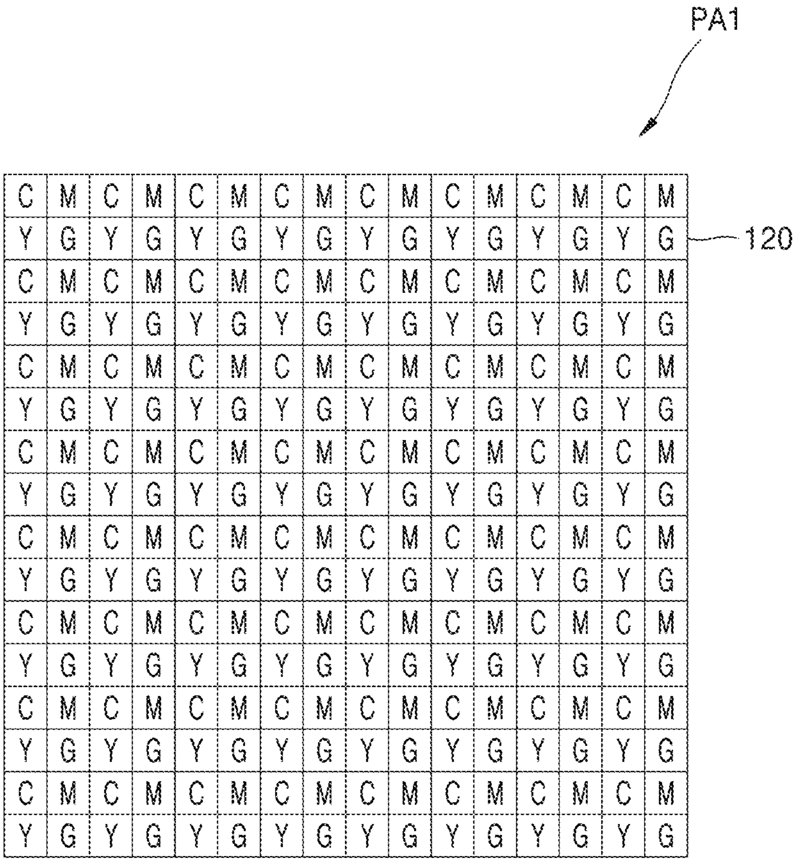
Figure 8:
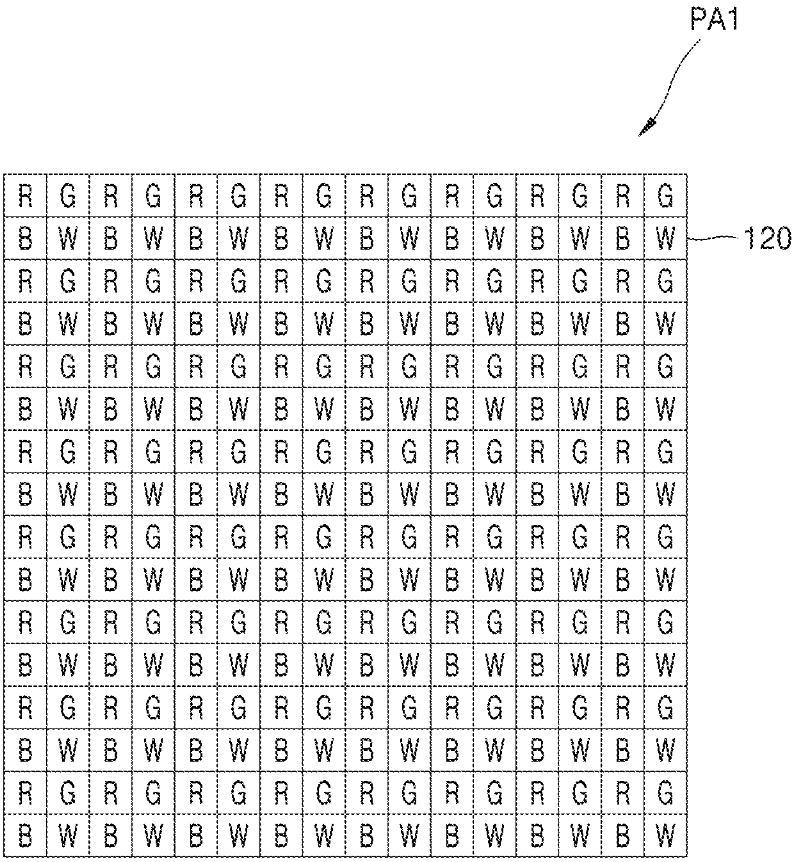

FIG. 5 shows a wavelength spectrum of the first image sensor 100 provided in the image acquisition device 1000 according to an example embodiment. FIGS. 6 to 8 show pixel arrangements of the first image sensor 100 provided in the image acquisition device 1000 according to an example embodiment.

Referring to FIG. 5, the first image sensor 100 may detect red light in a wavelength band having a center wavelength of about 650 nanometers (nm), detect green light in a wavelength band having a center wavelength of about 540 nm, and detect blue light in a wavelength band having a center wavelength of about 440 nm.

Referring to FIG. 6, filters that filter wavelength bands of red R, green G, and blue B are disposed in a Bayer pattern in the color filter 120 provided in the first pixel array PA1. In an embodiment, one unit pixel includes sub-pixels arranged in a 2×2 array, and a plurality of unit pixels are two-dimensionally and repeatedly arranged. Red filters and green filters are disposed in a first row of unit pixels, and green filters and blue filters disposed in a second row. Pixel arrangement is possible in other ways than the Bayer pattern.

For example, referring to FIG. 7, a CYGM arrangement in which a magenta pixel M, a cyan pixel C, a yellow pixel Y, and a green pixel G form one unit pixel is also possible.

In addition, referring to FIG. 8, an RGBW arrangement in which a green pixel G, a red pixel R, a blue pixel B, and a white pixel W form one unit pixel is also possible. In addition, although not shown, a unit pixel may have a 3×2 array form. In addition, pixels of the first pixel array PA1 may be arranged in various ways according to color characteristics of the first image sensor 100.

Figure 9:
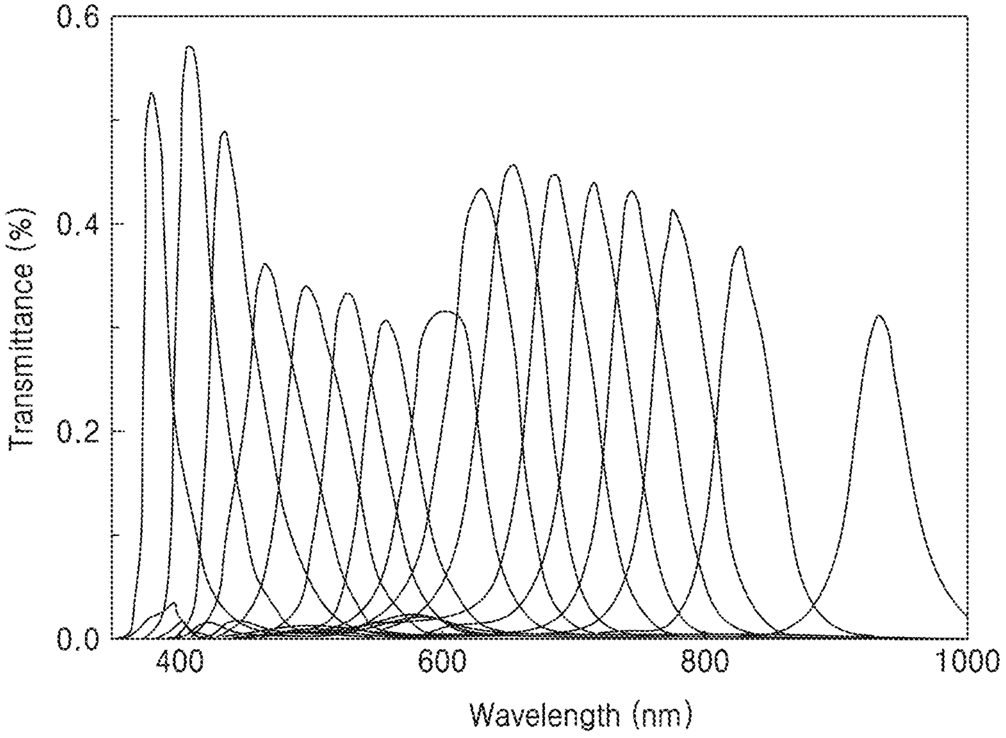
FIG. 9 shows a wavelength spectrum of a second image sensor provided in an image acquisition device according to an example embodiment.
Figure 10:
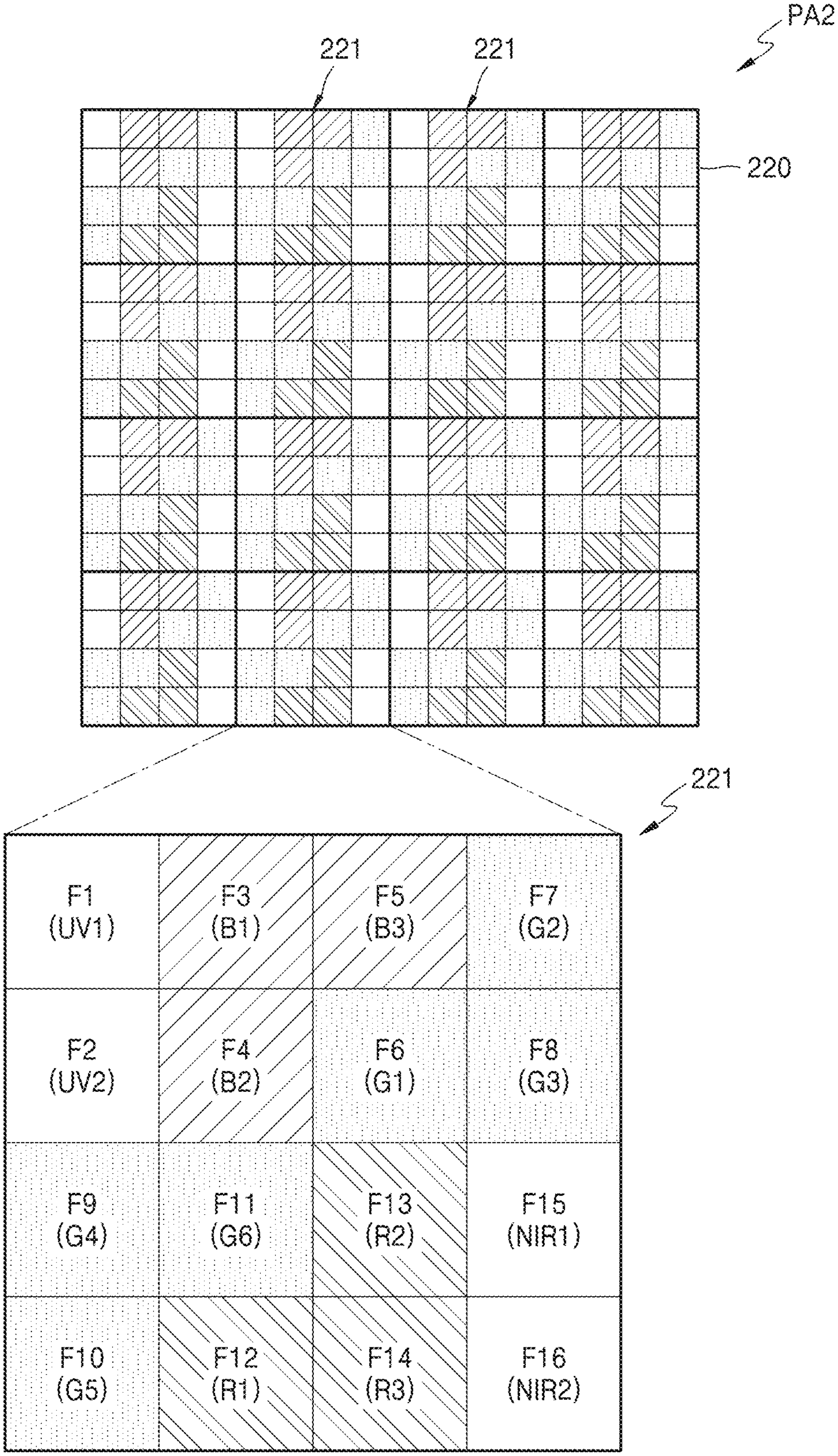
FIGS. 10 to 12 show pixel arrangements of a second image sensor provided in an image capture device according to an example embodiment.
Figure 11:
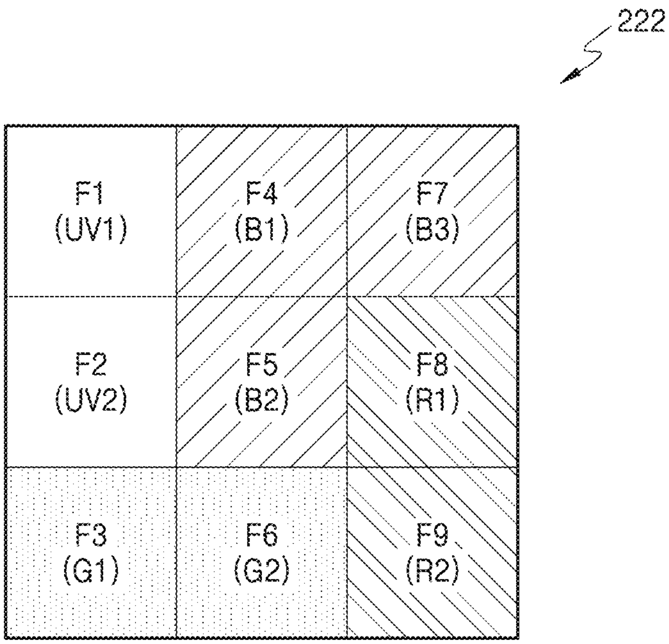
Figure 12:
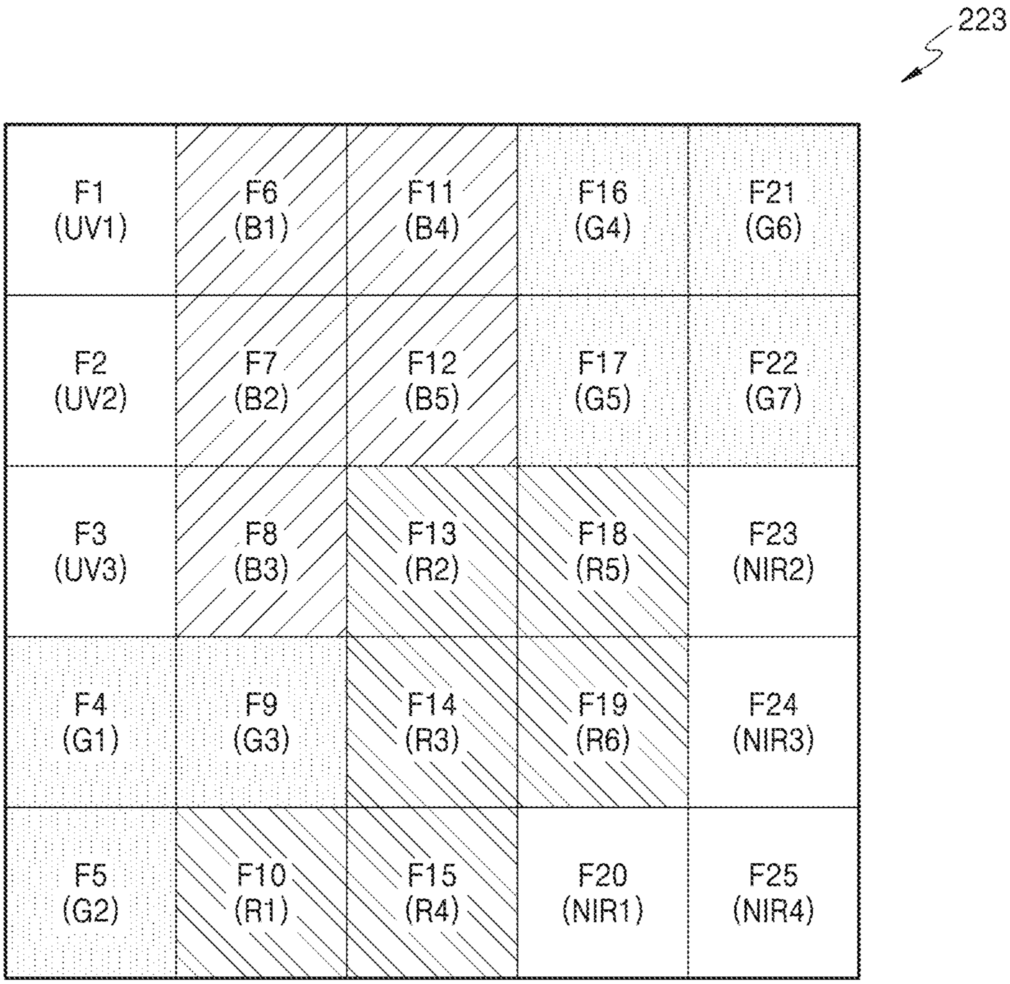

FIG. 9 shows a wavelength spectrum of the second image sensor 200 provided in the image acquisition device 1000 according to an example embodiment. FIGS. 10 to 12 show pixel arrangements of the second image sensor 200 provided in the image acquisition device 1000 according to an example embodiment.

Referring to FIG. 9, the second image sensor 200 may have 16 wavelength bands (or channels) with center wavelengths ranging from about 300 nm to about 950 nm. Referring to FIG. 10, the spectral filter 220 provided in the second pixel array PA2 may include a plurality of filter groups 221 arranged in a two-dimensional form. Here, each filter group 221 may include 16 unit filters F1 to F16 arranged in a 4×4 array.

The first and second unit filters F1 and F2 may respectively have central wavelengths UV1 and UV2 in an ultraviolet region, and the third to fifth unit filters F3 to F5 may respectively have central wavelengths B1 to B3 in a blue light region. The sixth to eleventh unit filters F6 to F11 may respectively have central wavelengths G1 to G6 in a green light region, and the twelfth to fourteenth unit filters F12 to F14 may respectively have central wavelengths R1 to R3 in a red light region. In addition, the fifteenth and sixteenth unit filters F15 and F16 may respectively have central wavelengths NIR1 and NIR2 in a near-infrared region.

FIG. 11 shows a plan view of another example of a filter group 222 provided in the spectral filter 220. Referring to FIG. 11, the filter group 222 may include the nine unit filters F1 to F9 arranged in a 3×3 array. Here, the first and second unit filters F1 and F2 may respectively have the central wavelengths UV1, UV2 in an ultraviolet region, and the fourth, fifth, and seventh unit filters F4, F5, and F7 may respectively have the central wavelengths B1 to B3 in a blue light region. The third and sixth unit filters F3 and F6 may respectively have the central wavelengths G1 and G2 in a green light region, and the eighth and ninth unit filters F8 and F9 may respectively have the central wavelengths R1 and R2 in a red light region.

FIG. 12 shows a plan view of another example of a filter group 223 provided in the spectral filter 220. Referring to FIG. 12, the filter group 223 may include 25 unit filters F1 to F25 arranged in a 5×5 array. Here, the first to third unit filters F1 to F3 may respectively have the central wavelengths UV1 to UV3 in an ultraviolet region, and the sixth, seventh, eighth, eleventh and twelfth unit filters F6, F7, F8, F11, and F12 may respectively have the central wavelengths B1 to B5 in a blue light region. The fourth, fifth and ninth unit filters F4, F5, and F9 may respectively have the central wavelengths G1 to G3 in a green light region, and the tenth, thirteenth, fourteenth, fifteenth, eighteenth, and nineteenth unit filters F10, F13, F14, F15, F18, and F19 may respectively have the central wavelengths R1 to R6 in a red light region. In addition, twentieth, twenty-third, twenty-fourth, and twenty-fifth unit filters F20, F23, F24, and F25 may respectively have central wavelengths NIR1 to NIR4 in a near-infrared region.

The unit filters F1 to F25 provided in the spectral filter 220 may have a resonance structure with two reflectors, and a transmission wavelength band may be determined according to characteristics of the resonance structure. The transmission wavelength band may be adjusted according to a material of a reflector, a material of a dielectric material in a cavity, and a thickness of the cavity. In addition, a structure using grating and a structure using a distributed Bragg reflector (DBR) may be applied to the unit filters F1 to F25.

In addition, pixels of the second pixel array PA2 may be arranged in various ways according to color characteristics of the second image sensor 200.

Figure 13:
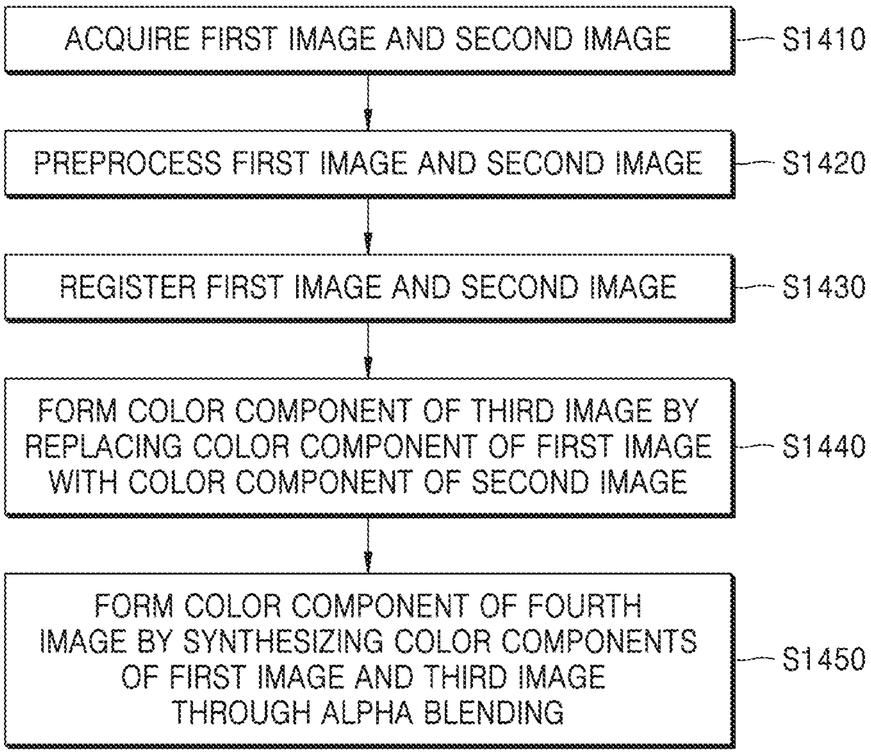
FIG. 13 is a flowchart schematically explaining an image processing process of an image acquisition device according to an example embodiment.

FIG. 13 is a flowchart schematically explaining an image processing process of the image acquisition device 1000 according to an example embodiment.

Referring to FIGS. 1 and 13, the image acquisition device 1000 acquires the first image IMG1 from the first image sensor 100, and acquires the second image IMG2 from the second image sensor 200 (S1410).

The image acquisition device 1000 may perform basic image processing on the first image IMG1 and/or the second image IMG2 before or after storing the first image IMG1 and/or the second image IMG2 in the memory 300. For example, the image acquisition device 1000 may perform bad pixel correction, fixed pattern noise correction, crosstalk reduction, remosaicing, demosaicing, false color reduction, denoising, chromatic aberration correction, etc. (S1420).

The image acquisition device 1000 uses relative position information between the first image sensor 100 and the second image sensor 200 to register the first image IMG1 and the second image IMG2 (S1430). The image acquisition device 1000 determines a positional relationship between pixels of each of the first image IMG1 and the second image IMG2 respectively acquired from the first image sensor 100 and the second image sensor 200 by considering, for example, a spatial resolution of each of the first image IMG1 and the second image IMG2, a field of view of an optical system used to acquire each of the first image IMG1 and the second image IMG2, a focal length, etc. At this time, the image acquisition device 1000 may overlay an image of one sensor (e.g., the first image of the first image sensor) on an image of another sensor (e.g., the second image of the second image sensor). For example, the image acquisition device 1000 may retrieve pixels of the second image IMG2 corresponding to each pixel of the first image IMG1 with respect to the first image IMG1 acquired by the first image sensor 100. To this end, the image acquisition device 1000 may perform scaling, translation, rotation, affine transform, perspective transform, etc. on the pixel of the second image IMG2.

The image acquisition device 1000 may form a color component of the third image IMG3 by replacing, in the first image IMG1, a color component of the first image IMG1 with a color component of the second image IMG2 (S1440). The image acquisition device 1000 uses the first image IMG1 as an input image and the second image IMG2 as a reference image and change a color of the first image IMG1 to match a color of the second image IMG2 and form the third image IMG3. In an embodiment, the color transfer unit 530 forms a color component of the third image IMG3 by matching (or replacing) a color statistic of the first image IMG1 with a color statistic of the second image IMG2. The color statistic may be based on an average value with respect to peripheral pixels adjacent to a central pixel and/or a standard deviation value with respect to the peripheral pixels adjacent to the central pixel.

The image acquisition device 1000 forms the color component of the fourth image IMG4 by synthesizing the color component of the first image IMG1 and the color component of the third image IMG3 through alpha blending (S1450).

A luminance component of the fourth image IMG4, like a luminance component of the third image IMG3, uses a luminance component value of the first image IMG1 as it is.

The image acquisition device 1000 forms the color component of the fourth image IMG4 by summing a value acquired by multiplying the color component of the first image IMG1 by the alpha blending coefficient $\alpha$ and a value acquired by multiplying the color component of a third image IMG3 by "$1-\alpha$". The alpha blending coefficient $\alpha$ may have a value between about 0 or more and about 1 or less. The image acquisition device 1000 determines a value of the alpha blending coefficient $\alpha$ by logical sum of the first coefficient $\alpha_1$ and the second coefficient $\alpha_2$. In an example embodiment, the image acquisition device 1000 may determine a greater value among the first coefficient $\alpha_1$ and the second coefficient $\alpha_2$ as the value of the alpha blending coefficient $\alpha$.

The first coefficient $\alpha_1$ is a parameter related to the occlusion region determined according to the disparity between the first image IMG1 and the second image IMG2. The second coefficient $\alpha_2$ is a parameter related to false color information of the third image IMG3.

The image acquisition device 1000 described above may be employed in various high-performance optical devices or high-performance electronic devices. The electronic devices may include, for example, smart phones, mobile phones, cell phones, personal digital assistants (PDAs), laptops, PCs, various portable devices, home appliances, security cameras, medical cameras, automobiles, Internet of Things (IoT) devices, other mobile or non-mobile computing device, but are not limited thereto.

In addition to the image acquisition device 1000, the electronic devices may further include a processor, for example, an application processor (AP), configured to control image sensors provided therein, and may control multiple hardware or software components by running an operating system or application program through the processor, and perform various data processing and calculation operations. The processor may further include, for example, a graphics processing unit (GPU) and/or an image signal processor. When the processor includes the image signal processor, an image (or video) acquired by the image sensor may be stored and/or output by using the processor.

Figure 14:
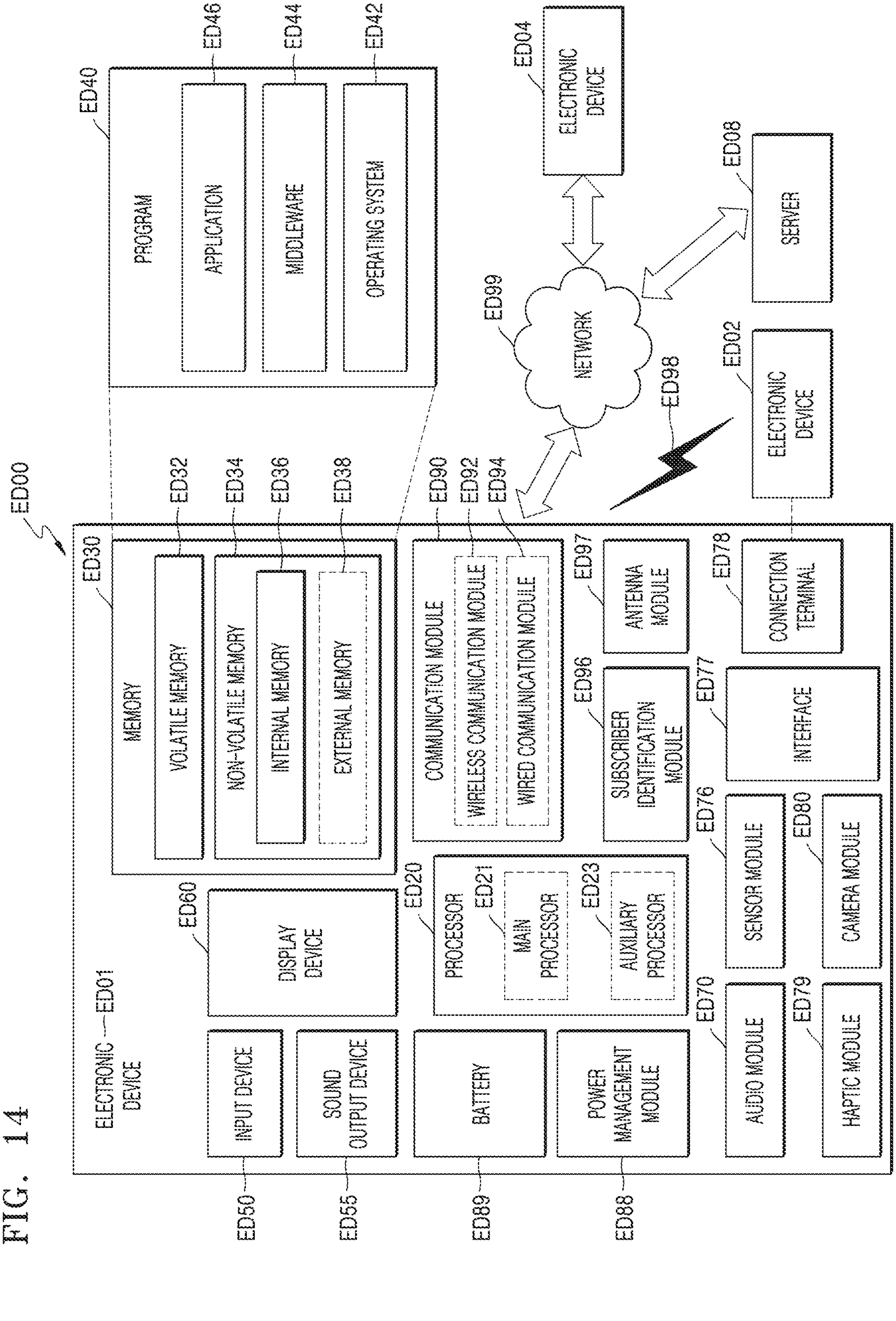
FIG. 14 is a block diagram showing the schematic structure of an electronic device according to an example embodiment.

FIG. 14 is a block diagram showing a schematic structure of an electronic device according to an example embodiment. Referring to FIG. 14, in a network environment ED00, the electronic device ED01 may communicate with another electronic device ED02 via a first network ED98 (e.g., short-range wireless communication network, etc.), and/or may communicate with another electronic device ED04 and/or a server ED08 via a second network ED99 (e.g., long-range wireless communication network, etc.) The electronic device ED01 may communicate with the electronic device ED04 via the server ED08. The electronic device ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. The number and arrangement of components of the network environment ED00 shown in FIG. 14 are provided as an example. In practice, there may be additional components, fewer components, different components, or differently arranged components than those shown in FIG. 14. Furthermore, in the electronic device ED01, some of the components (e.g., display device ED60, etc.) may be omitted and/or another component may be added. Some of the components may be configured as one integrated circuit. For example, the sensor module ED76 (e.g., a fingerprint sensor, an iris sensor, an illuminance sensor, etc.) may be embedded and implemented in the display device ED60 (e.g., display, etc.) In addition, when the image acquisition device 1000 includes a spectral function, some functions of the sensor module (e.g., color sensor, illuminance sensor) may be implemented in the image acquisition device 1000 itself rather than in a separate sensor module.

The processor ED20 may control one or more components (e.g., hardware, software components, etc.) of the electronic device ED01 connected to the processor ED20 by executing software (e.g., program ED40, etc.), and may perform various data processes or operations. As a part of the data processing or operations, the processor ED20 may load a command and/or data received from another component (e.g., sensor module ED76, communication module ED90, etc.) to a volatile memory ED32, may process the command and/or data stored in the volatile memory ED32, and may store result data in a non-volatile memory ED34. The processor ED20 may include a main processor ED21 (e.g., central processing unit, application processor, etc.) and an auxiliary processor ED23 (e.g., graphic processing unit, image signal processor, sensor hub processor, communication processor, etc.) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (e.g., sleep state) or along with the main processor ED21 while the main processor ED21 is in an active state (e.g., application executed state), may control functions and/or states related to some of the components (e.g., display device ED60, sensor module ED76, communication module ED90, etc.) in the electronic device ED01. The auxiliary processor ED23 (e.g., image signal processor, communication processor, etc.) may be implemented as a part of another component (e.g., camera module ED80, communication module ED90, etc.) that is functionally related thereto.

The memory ED30 may store various data to be used by the components (e.g., processor ED20, sensor module ED76, etc.) of the electronic device ED01. The data may include, for example, input data and/or output data about software (e.g., program ED40, etc.) and commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored as software in the memory ED30, and may include an operation system ED42, middleware ED44, and/or an application ED46.

The input device ED50 may receive commands and/or data to be used in the components (e.g., processor ED20, etc.) of the electronic device ED01, from outside (e.g., user, a surrounding environment, etc.) of the electronic device ED01. The input device ED50 may include a microphone, a mouse, a keyboard, and/or a digital pen (e.g., stylus pen), a button, a switch, a camera, a virtual reality (VR) headset, haptic gloves, and the like.

The sound output device ED55 may output a sound signal to outside of the electronic device ED01. The sound output device ED55 may include a speaker and/or a receiver, a speaker, a buzzer, an alarm, and the like. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic device ED01. The display device ED60 may include a display (e.g., a liquid crystal display (LCD), light-emitting diodes (LEDs), organic light emitting diodes (OLEDs), etc.), a hologram device, or a projector, and a control circuit for controlling the corresponding device. The display device ED60 may include a touch circuitry set to sense a touch, and/or a sensor circuit (e.g., pressure sensor, etc.) that is set to measure a strength of a force generated by the touch.

The audio module ED70 may convert sound into an electrical signal or vice versa. The audio module ED 70 may acquire sound through the input device ED50, or may output sound via the sound output device ED55 and/or a speaker and/or a headphone of another electronic device (e.g., electronic device ED02, etc.) connected directly or wirelessly to the electronic device ED01.

The sensor module ED76 may sense an operating state (e.g., power, temperature, etc.) of the electronic device ED01, or an outer environmental state (e.g., user state, brightness level, time of day, geographic location, etc.), and may generate an electrical signal and/or data value corresponding to the sensed state. The sensor module ED76 may include a gesture sensor, a gyro-sensor, an accelerometer, a pressure sensor, a magnetic sensor, an acceleration sensor, a grip sensor, a proximity sensor, a color sensor, an infrared (IR) ray sensor, a vivo sensor, a temperature sensor, a humidity sensor, an illuminance sensor, an actuator, a transducer, a contact sensor, a ranging device, a global positioning system (GPS) sensor, and the like.

The interface ED77 may support one or more designated protocols that may be used in order for the electronic device ED01 to be directly or wirelessly connected to another electronic device (e.g., electronic device ED02, etc.) The interface ED77 may include a high-definition multimedia interface (HDMI), a universal serial bus (USB) interface, an SD card interface, and/or an audio interface.

The connection terminal ED78 may include a connector by which the electronic device ED01 may be physically connected to another electronic device (e.g., electronic device ED02, etc.). The connection terminal ED78 may include an HDMI connector, a USB connector, an SD card connector, and/or an audio connector (e.g., headphone connector, etc.).

The haptic module ED79 may convert the electrical signal into a mechanical stimulation (e.g., vibration, motion, etc.) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include the image acquisition device 10000 described above, an additional lens assembly, image signal processors, and/or flashes. The lens assembly included in the camera module ED80 may collect light emitted from a subject that is an object to be captured.

The power management module ED88 may manage the power supplied to the electronic device ED01. The power management module ED88 may be implemented as a part of a power management integrated circuit (PMIC).

The battery ED89 may supply electric power to components of the electronic device ED01. The battery ED89 may include a primary battery that is not rechargeable, a secondary battery that is rechargeable, and/or a fuel cell.

The communication module ED90 may support the establishment of a direct (e.g., wired) communication channel and/or a wireless communication channel between the electronic device ED01 and another electronic device (e.g., electronic device ED02, the electronic device ED04, the server ED08, etc.), and execution of communication through the established communication channel. The communication module ED90 may be operated independently from the processor ED20 (application processor, etc.), and may include one or more communication processors that support the direct communication and/or the wireless communication. The communication module ED90 may include a wireless communication module ED92 (e.g., cellular communication module (e.g., fifth generation (5G), long-term evolution (LTE), code division multiple access (CDMA), and the like), a short-range wireless communication module (e.g., FlashLinQ, WiMedia, Bluetooth™, Bluetooth™ Low Energy (BLE), ZigBee, Institute of Electrical and Electronics Engineers (IEEE) 802.11x (Wi-Fi), and the like), a global navigation satellite system (GNSS) communication module) and/or a wired communication module ED94 (e.g., local area network (LAN) communication module, a power line communication module, an IEEE 1094 (FireWire) module, etc.). From among the communication modules, a corresponding communication module may communicate with another electronic device via a first network ED09 (e.g., short-range communication network such as Bluetooth™, Wi-Fi direct, or infrared data association (IrDA)) or a second network ED99 (e.g., long-range communication network such as a cellular network, Internet, or computer network (e.g., LAN, WAN, etc.)). Such above various kinds of communication modules may be integrated as one component (e.g., single chip, etc.) or may be implemented as a plurality of components (e.g., a plurality of chips) separately from one another. The wireless communication module ED92 may identify and authenticate the electronic device ED01 in a communication network such as the first network ED98 and/or the second network ED99 by using subscriber information (e.g., international mobile subscriber identifier (IMSI), etc.) stored in the subscriber identification module ED96.

The antenna module ED97 may transmit or receive the signal and/or power to/from outside (e.g., another electronic device, etc.) An antenna may include a radiator formed as a conductive pattern formed on a substrate (e.g., printed circuit board (PCB), etc.). The antenna module ED97 may include one or more antennas. When the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic device via the selected antenna. Another component (e.g., a radio-frequency integrated circuit (RFIC), etc.) other than the antenna may be included as a part of the antenna module ED97.

Some of the components may be connected to one another via the communication method among the peripheral devices (e.g., bus, general purpose input and output (GPIO), serial peripheral interface (SPI), mobile industry processor interface (MIPI), etc.) and may exchange signals (e.g., commands, data, etc.).

The command and/or data may be transmitted and/or received between the electronic device ED01 and the external electronic device ED04 via the server ED08 connected to the second network ED99. Other electronic devices ED02 and ED04 may be the devices that are the same as or different kinds from the electronic device ED01. All or some of the operations executed in the electronic device ED01 may be executed in one or more devices among the other electronic devices ED02, ED04, and ED08. For example, when the electronic device ED01 is to perform a certain function or service, the electronic device ED01 may request one or more other electronic devices to perform some or entire function or service, instead of executing the function or service by itself. One or more electronic devices receiving the request execute an additional function or service related to the request and may transfer a result of the execution to the electronic device ED01. To do this, for example, a cloud computing, a distributed computing, or a client-server computing technique may be used.

Figure 15:
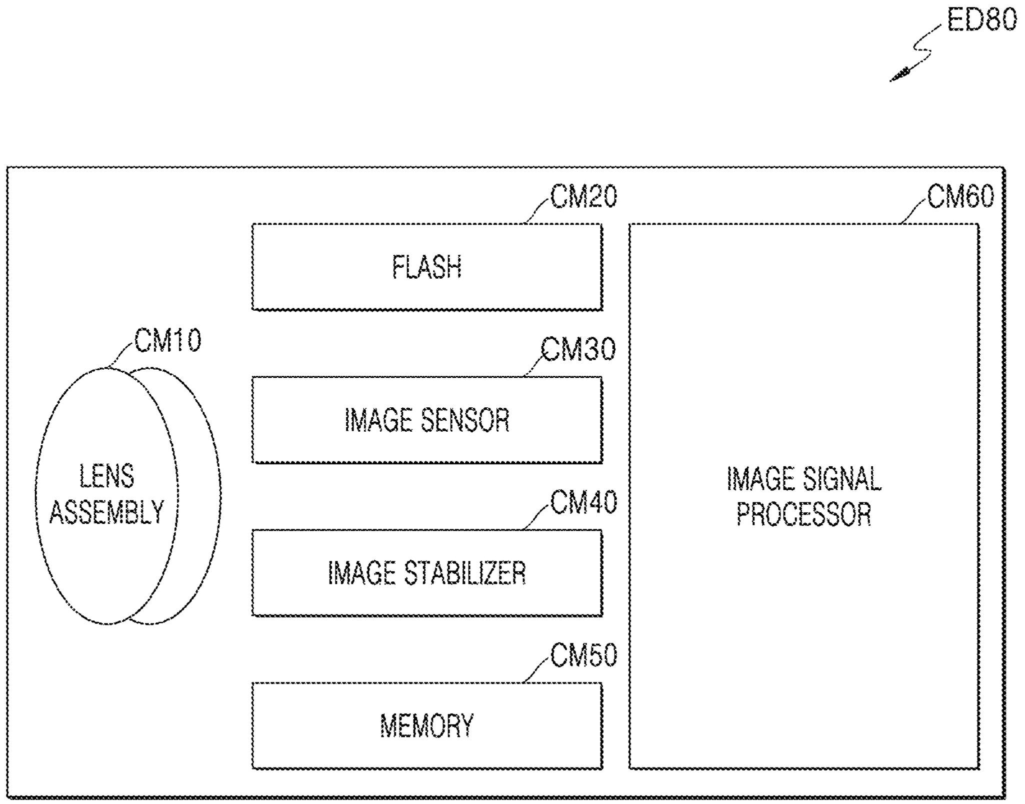
FIG. 15 is a block diagram schematically showing a camera module provided in the electronic device of FIG. 14.

FIG. 15 is a block diagram schematically showing the camera module ED80 provided in the electronic device ED01 of FIG. 14. The camera module ED80 may include the image acquisition device 1000 described above, or may have a structure modified therefrom. Referring to FIG. 15, the camera module ED80 may include a lens assembly CM10, a flash CM20, an image sensor CM30, an image stabilizer CM40, a memory CM50 (e.g., a buffer memory, etc.), and/or an image signal processor CM60.

The image sensor CM30 may include the first image sensor 100 and the second image sensor 200 provided in the image acquisition device 1000 described above. The first image sensor 100 and the second image sensor 200 may convert light emitted or reflected from the subject and transmitted through the lens assembly CM10 into electrical signals, thereby acquiring an image corresponding to the subject. The first image sensor 100 may acquire an RGB image, and the second image sensor 200 may acquire a hyperspectral image in an ultraviolet to infrared wavelength range.

The image sensor CM30 may include one or a plurality of sensors selected from image sensors having different attributes such as an RGB sensor, a black and white (BW) sensor, an IR sensor, or UV sensor, in addition to the first image sensor 100 and the second image sensor 200. Each sensor included in the image sensor CM30 may be implemented by a CCD sensor and/or a CMOS sensor.

The lens assembly CM10 may collect light emitted from a subject for image capturing. The camera module ED80 may include a plurality of lens assemblies CM10, and in this case, the camera module ED80 may include, for example, a dual camera, a 360 degrees camera, or a spherical camera. Some of the lens assemblies CM10 may have the same lens attributes (e.g., a viewing angle, a focal length, auto focus, F Number, optical zoom, etc.), or different lens attributes. The lens assembly CM10 may include a wide angle lens or a telescopic lens.

The lens assembly CM10 may be configured and/or focus controlled so that two image sensors included in the image sensor CM30 may form an optical image of a subject at the same position.

The flash CM20 may emit light used to reinforce light emitted or reflected from a subject. The flash CM20 may include one or a plurality of light-emitting diodes (e.g., a red-green-blue (RGB) LED, a white LED, an infrared LED, an ultraviolet LED, etc.), and/or a xenon lamp.

The image stabilizer CM40, in response to a motion of the camera module ED80 or the electronic device ED01 including the camera module ED80, moves one or more lenses included in the lens assembly CM10 and/or the image sensor CM30 in a certain direction or controls the operating characteristics of the image sensor CM30 (e.g., adjusting of a read-out timing, etc.) in order to compensate for a negative influence of the motion. The image stabilizer CM40 may sense the movement of the camera module ED80 or the electronic device ED01 by using a gyro sensor (not shown) or an acceleration sensor (not shown) arranged in or out of the camera module ED80. The image stabilizer CM40 may be implemented as an optical type.

The memory CM50 may store a part or entire data of an image acquired through the image sensor 20 for a subsequent image processing operation. For example, when a plurality of images are acquired at high speed, only low resolution images are displayed while the acquired original data (e.g., Bayer-Patterned data, high resolution data, etc.) is stored in the memory CM50. Then, the memory CM50 may be used to transmit the original data of a selected (e.g., user selection, etc.) image to the image signal processor CM60. The memory CM50 may be incorporated into the memory ED30 of the electronic device ED01, or configured to be an independently operated separate memory.

The image signal processor CM60 may perform image processing on the image acquired through the image sensor CM30 or the image data stored in the memory CM50. As described in FIGS. 1 to 13, a third image with an expanded color gamut may be formed by processing the first image (e.g., RGB image) and the second image (e.g., hyperspectral image) acquired by the two image sensors included in the image sensor CM30. The configuration of the processor 500 described with reference to FIG. 1 may be included in the image signal processor CM60.

The image processing performed by the image signal processor CM60 may include, for example but not limited to, depth map generation, three-dimensional modeling, panorama generation, feature point extraction, image synthesis, and/or image compensation (e.g., noise reduction, resolution adjustment, brightness adjustment, blurring, sharpening, softening, etc.) The image signal processor CM60 may perform control (e.g., exposure time control, or read-out timing control, etc.) on constituent elements (e.g., the image sensor CM30, etc.) included in the camera module ED80. The image processed by the image signal processor CM60 may be stored again in the memory CM50 for additional processing and/or provided to external constituent elements (e.g., the memory ED30, the display device ED60, the electronic device ED02, the electronic device ED04, the server ED08, etc.) of the camera module ED80. The image signal processor CM60 may be incorporated into the processor ED20, or configured to be a separate processor operated independently of the processor ED20. When the image signal processor CM60 is configured as a separate processor from the processor ED20, the image processed by the image signal processor CM60 may undergo additional image processing by the processor ED20 and then displayed through the display device ED60.

The electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a read side camera.

FIGS. 16A to 16E and FIGS. 17A to 17E show various examples of electronic devices to which an image acquisition device according to an example embodiment is applied.

Figure 16A:
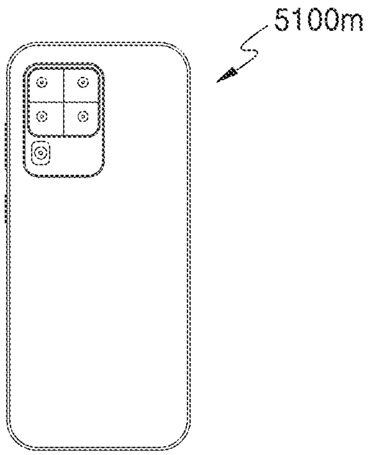
FIGS. 16A to 16E and FIGS. 17A to 17E show various examples of electronic devices to which an image acquisition device according to an example embodiment is applied.
Figure 16B:
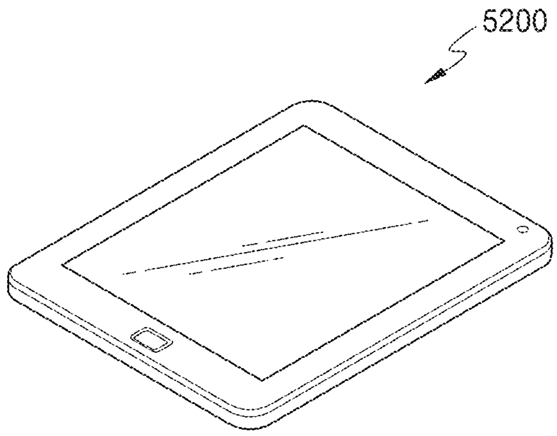
Figure 16C:
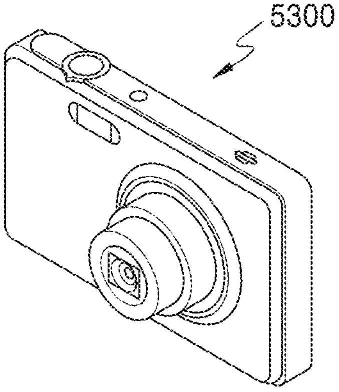
Figure 16D:
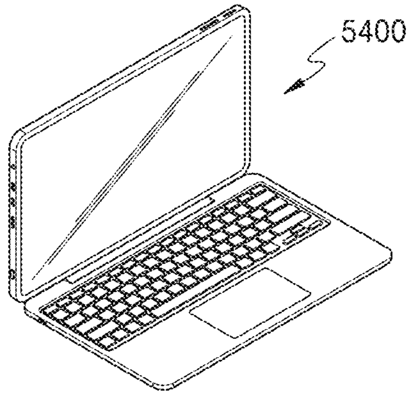
Figure 16E:
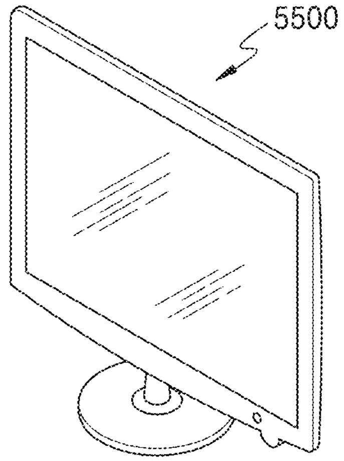

The image acquisition device 1000 according to some embodiments may be applied to a mobile phone or smart phone 5100*m* illustrated in FIG. 16A, a tablet or smart tablet 5200 illustrated in FIG. 16B, a digital camera or camcorder 5300 illustrated in FIG. 16C, a notebook computer 5400 illustrated in FIG. 16D, a television or smart television 5500 illustrated in FIG. 16E, etc. For example, the smart phone 5100*m* or the smart tablet 5200 may include a plurality of high resolution cameras, each having a high resolution image sensor mounted thereon. Depth information of a subject in an image may be extracted by using high resolution cameras, out focusing of the image may be adjusted, or the subject in the image may be automatically identified.

Figure 17A:
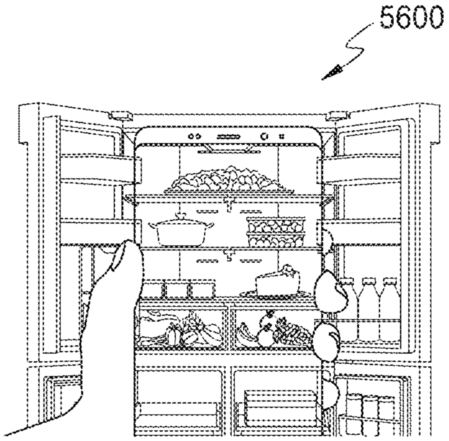
Figure 17B:
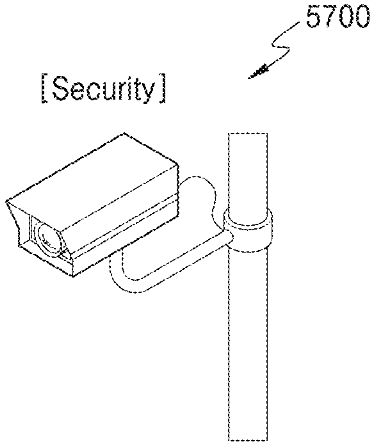
Figure 17C:
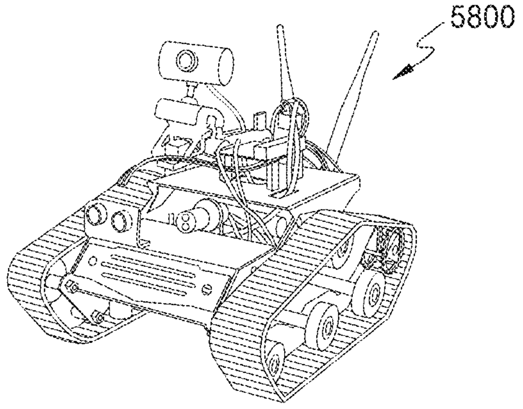
Figure 17D:
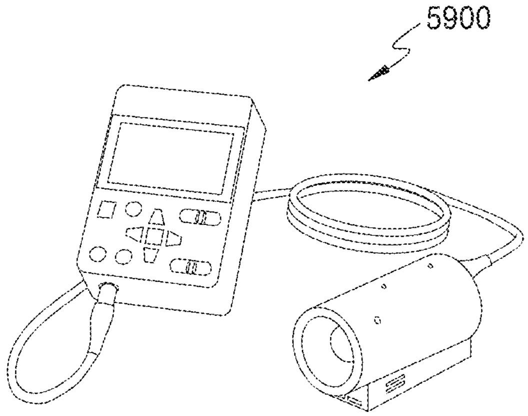

Furthermore, the image acquisition device 1000 may be applied to a smart refrigerator 5600 illustrated in FIG. 17A, a security camera 5700 illustrated in FIG. 17B, a robot 5800 illustrated in FIG. 17C, a medical camera 5900 illustrated in FIG. 17D, etc. For example, the smart refrigerator 5600 may automatically recognize food in a refrigerator, by using the image acquisition device 1000, and notify a user of the presence of a particular food, the type of food that is input or output, and the like, through a smartphone. The security camera 5700 may provide an ultrahigh resolution image and may recognize an object or a person in an image in a dark environment by using high sensitivity. The robot 5800 may be provided in a disaster or industrial site that is not directly accessible by people, and may provide a high resolution image. The medical camera 5900 may provide a high resolution image for diagnosis or surgery, and thus a field of vision may be dynamically adjusted.

Figure 17E:
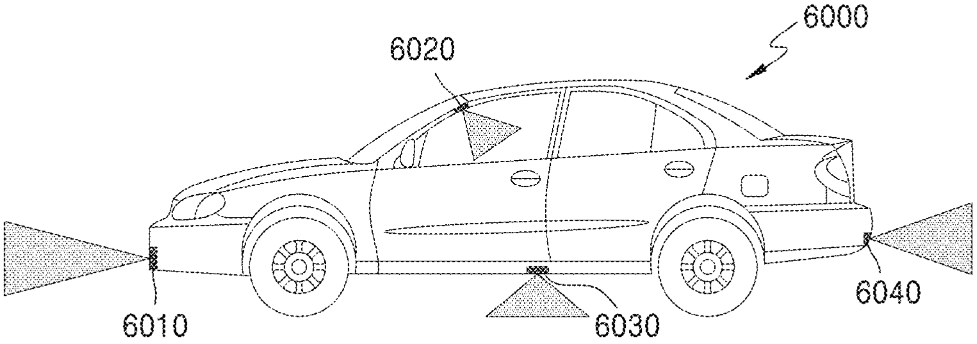

Furthermore, the image acquisition device 1000 may be applied to a vehicle 6000 as illustrated in FIG. 17E. The vehicle 6000 may include a plurality of vehicle cameras 6010, 6020, 6030, and 6040 arranged at various positions. Each of the vehicle cameras 6010, 6020, 6030, and 6040 may include the image acquisition device 1000 according to an example embodiment. The vehicle 6000 may provide a driver with various pieces of information about the inside or periphery of the vehicle 6000, by using the vehicle cameras 6010, 6020, 6030, and 6040. For example, vehicle 6000 may provide information on an object or a person in an image, which may be automatically recognized and used for autonomous driving.

It should be understood that embodiments described herein should be considered in a descriptive sense only and not for purposes of limitation. Descriptions of features or aspects within each embodiment should be considered as available for other similar features or aspects in other embodiments. While one or more example embodiments have been described with reference to the figures, it should be understood by those of ordinary skill in the art that various changes in form and details may be made therein without departing from the spirit and scope as defined by the following claims.

What is claimed is:

1. An image acquisition device comprising:

a first image sensor having a first spatial resolution and configured to acquire a first image based on a first wavelength band;

a second image sensor having a second spatial resolution lower than the first spatial resolution and configured to acquire a second image based on a second wavelength band wider than the first wavelength band; and a processor configured to:

register the first image and the second image in association with each other, by using a relative position information between the first image sensor and the second image sensor;

generate a third image, of which a color component is determined by replacing a color component of the first image with a color component of the second image; and generate a fourth image, of which a color component is determined by synthesizing the color component of the first image and the color component of the third image through alpha blending.

2. The image acquisition device of claim 1, wherein the processor is configured to determine the color component of the fourth image by summing a value, acquired by multiplying the color component of the first image by an alpha blending coefficient $\alpha$, and a value, acquired by multiplying the color component of the third image by $(1-\alpha)$, and the alpha blending coefficient $\alpha$ has a value between 0 or more and 1 or less.

3. The image acquisition device of claim 2, wherein the processor is configured to determine the alpha blending coefficient $\alpha$ as a logical sum of a first coefficient and a second coefficient, the first coefficient represents information about an occlusion region according to a disparity between the first image and the second image, and the second coefficient represents false color information of the color component of the third image.

4. The image acquisition device of claim 3, wherein the processor is configured to:

set the first coefficient of a pixel of interest of the first image to 1 when no pixel of the second image corresponds to the pixel of interest of the first image; and set the first coefficient to 0 when at least one pixel of the second image corresponds to the pixel of interest of the first image.

5. The image acquisition device of claim 3, wherein the processor is configured to determine a greater value among the first coefficient and the second coefficient as a value of the alpha blending coefficient $\alpha$.

6. The image acquisition device of claim 3, wherein the second coefficient is proportional to a color difference between the first image and the third image and has a value between 0 or more and 1 or less.

7. The image acquisition device of claim 3, wherein the second coefficient has a value closer to 0 as a saturation of the first image increases, or closer to 1 as the saturation of the first image decreases.

8. The image acquisition device of claim 3, wherein the processor is configured to:

set the second coefficient, based on a difference in luminance values between corresponding pixels of the first image and the second image, such that the second coefficient is closer to 1 as the difference increases or closer to 0 as the difference decreases.

9. The image acquisition device of claim 1, wherein the processor is configured to calculate parameters for registering the first image and the second image, based on at least one of the relative position information, a resolution, a field of view, or a focal length of each of the first image sensor and the second image sensor.

10. The image acquisition device of claim 1, wherein the third image has the first spatial resolution and a color gamut that corresponds to a color gamut of the second image.

11. The image acquisition device of claim 1, wherein the processor is configured to determine the color component of the third image by matching a color statistic of the first image with a color statistic of the second image.

12. The image acquisition device of claim 11, wherein the color statistic corresponds to an average value with respect to peripheral pixels adjacent to a central pixel.

13. The image acquisition device of claim 12, wherein the processor is configured to calculate the average value by weighting a similarity between the central pixel and the peripheral pixels.

14. The image acquisition device of claim 13, wherein the similarity is calculated by using, as feature vectors, a luminance value of the central pixel and luminance values of the peripheral pixels.

15. The image acquisition device of claim 11, wherein the color statistic corresponds to a standard deviation value with respect to peripheral pixels adjacent to a central pixel.

16. The image acquisition device of claim 15, wherein the processor is configured to calculate the standard deviation value by weighting a standard deviation with a similarity between the central pixel and the peripheral pixels.

17. The image acquisition device of claim 1, wherein the processor is configured to separate the first image and the second image into a luminance component and a color component, respectively, and generate the third image and the fourth image by using the separated first image and the separated second image.

18. The image acquisition device of claim 1, wherein the processor is configured to register the first image and the second image by extracting at least one of an edge feature or a corner feature from the first image and the second image, and matching the extracted at least one of the edge feature or the corner feature between the first image and the second image.

19. An electronic device including the image acquisition device of claim 1.

20. A method of controlling an image acquisition device, the method comprising:

acquiring a first image from a first image sensor and acquiring a second image from a second image sensor;

registering the acquired first image and the acquired second image in association with each other;

generating a third image, of which a color component is determined by replacing a color component of the first image with a color component of the second image; and generating a fourth image, of which a color component is determined by synthesizing the color component of the first image and the color component of the third image through alpha blending.

* * * * *